(12) United States Patent
Bang

(10) Patent No.: US 12,181,039 B2
(45) Date of Patent: Dec. 31, 2024

(54) VEHICLE GEAR KNOB

(71) Applicant: Jae Yong Bang, Sejong (KR)

(72) Inventor: Jae Yong Bang, Sejong (KR)

( * ) Notice: Subject to any disclaimer, the term of this patent is extended or adjusted under 35 U.S.C. 154(b) by 0 days.

(21) Appl. No.: 18/038,613

(22) PCT Filed: Sep. 28, 2021

(86) PCT No.: PCT/KR2021/013169
§ 371 (c)(1),
(2) Date: May 24, 2023

(87) PCT Pub. No.: WO2022/119089
PCT Pub. Date: Jun. 9, 2022

(65) Prior Publication Data
US 2024/0011557 A1    Jan. 11, 2024

(30) Foreign Application Priority Data

Dec. 4, 2020 (KR) .......................... 10-2020-0168625

(51) Int. Cl.
*F16H 59/12* (2006.01)
*F16H 59/02* (2006.01)
*F16H 59/08* (2006.01)

(52) U.S. Cl.
CPC ......... *F16H 59/12* (2013.01); *F16H 59/0278* (2013.01); *F16H 2059/0295* (2013.01); *F16H 2059/081* (2013.01)

(58) Field of Classification Search
CPC ................. F16H 59/12; F16H 59/0278; F16H 2059/0295; F16H 2059/081

USPC ........................................................ 74/473.3
See application file for complete search history.

(56) References Cited

U.S. PATENT DOCUMENTS

| 2019/0323599 | A1 | 10/2019 | Moreno et al. |
| 2022/0345130 | A1* | 10/2022 | Vollkommer ........... F16H 61/24 |

FOREIGN PATENT DOCUMENTS

| JP | 8-115641 A | 5/1996 |
| JP | 2014-229475 A | 12/2014 |
| JP | 2017-19341 A | 1/2017 |
| KR | 10-1637723 B1 | 7/2016 |
| KR | 10-2017-0000718 A | 1/2017 |
| KR | 10-2017-0080081 A | 7/2017 |
| KR | 10-1906443 B1 | 10/2018 |
| KR | 10-1932128 B1 | 12/2018 |

(Continued)

*Primary Examiner* — T. Scott Fix
(74) *Attorney, Agent, or Firm* — Birch, Stewart, Kolasch & Birch, LLP

(57) ABSTRACT

Disclosure relates to a vehicle gear knob replacing a transmission structure including an R button, a D button, and an N button, with a gear rod method or a rotary jog/shuttle method, the vehicle gear knob including: a lower support including a pair of first grooves to which the R button and the D button are guided, respectively, and a second groove to which the N button is guided; an upper support provided above the lower support and blocking the R button, the D button, and the N button from being exposed; a press operation part coupled to the upper support and operating the N button by a pressing force; and a grip part provided above the press operation part and selectively operating the R button or the D button by using the lever principle, if a driver grips the grip part and applies force thereto.

13 Claims, 25 Drawing Sheets

(56) References Cited

FOREIGN PATENT DOCUMENTS

KR      10-1976448 B1    5/2019
KR      10-2214410 B1    2/2021

\* cited by examiner

VEHICLE GEAR KNOB

CROSS REFERENCE TO RELATED APPLICATIONS

This application is the National Phase of PCT International Application No. PCT/KR2021/013169, filed on Sep. 28, 2021, which claims priority under 35 U.S.C. 119 (a) to Patent Application No. 10-2020-0168625, filed in the Republic of Korea on Dec. 4, 2020, all of which are hereby expressly incorporated by reference into the present application.

TECHNICAL FIELD

The present disclosure relates to a gear knob for gear shifting manipulation of a vehicle.

More particularly, the present disclosure relates to a vehicle gear knob capable of correcting gear-mishandling of a driver to contribute to safe driving by replacing a button type gear for gear shifting manipulation of a vehicle with a gear rod method or a rotary jog/shuttle method using the lever principle.

BACKGROUND ART

In general, a transmission structure applied to a vehicle allows shift manipulation to be performed by movement of a cable according to direction manipulation of a gear rod.

As another example, a separate button is provided in the gear rod in order to prevent a malfunction of the gear rod, and shift manipulation is possible only after the button is pressed.

Recently, electric transmission structures are being developed by changing the transmission structure of the gear rod method generally applied, and as typical examples among the electric transmission structures, there are a rotary log/shuttle method, a button method, etc.

The transmission structure of the rotary jog/shuttle method and the button method may be manufactured in a smaller size, compared to the conventional gear rod, so that the structure can secure larger indoor space, be operated with little force, and reduce noise and vibration.

Among these methods, the button method is configured such that a driver directly presses P (Parking), R (Reverse), N (Neutral), D (Driving) buttons to operate gear shifting, but since the plurality of buttons are formed at different positions, an intuitive gear manipulation may not be performed and a driver's eyes may be distracted.

Therefore, the driver may press a button incorrectly or the driver is unable to respond quickly when a gear shift is required in an emergency, resulting in a safety accident.

Moreover, when each button in the transmission structure of the button method is arranged in a vertical array, not a horizontal array, a driver's wrist is used to press each button, and at this time, the driver has a pain by straining the wrist.

DISCLOSURE

Technical Problem

The present disclosure has been made keeping in the above problems occurring in the related art, and an objective of the present disclosure is intended to provide a vehicle gear knob that is configured to replace a shift operating mechanism from an existing button method to a gear rod method or a rotary jog/shuttle method using the lever principle so as to correct gear-mishandling of a driver to contribute to safe driving, and to perform quick response when a gear shift is required in an emergency.

Technical Solution

In order to achieve the above objective, according to the present disclosure, there is provided a vehicle gear knob which replaces a transmission structure comprising an R button, a D button, and an N button, with a gear rod method or a rotary jog/shuttle method, the vehicle gear knob including: a lower support which may include a pair of first grooves to which the button and the D button may be guided, respectively, and a second groove to which the N button is guided; an upper support which may be provided on the lower support and block the R button, the D button, and the N button from being exposed; a press operation part which may be coupled to the upper support and operate the N button by a pressing force; and a grip part which may be provided on the press operation part and selectively operates the R button or the D button by using lever principle, when a driver grips the grip part and applies a force thereto.

Advantageous Effects

The present disclosure is configured to replace the shift operating mechanism from the existing button method to a gear rod method or a rotary jog/shuttle method using the lever principle. Therefore, it is possible to correct gear-mishandling of a driver, to reduce the rate of accidents due to malfunction to contribute to safe driving, and to enable rapid replacement when change in speed is required in an emergency.

Furthermore, the change of the transmission structure allows the driver to intuitionally perform shifting manipulation, thereby preventing the visual field of the driver from being dispersed and providing the convenience.

Figure 1:
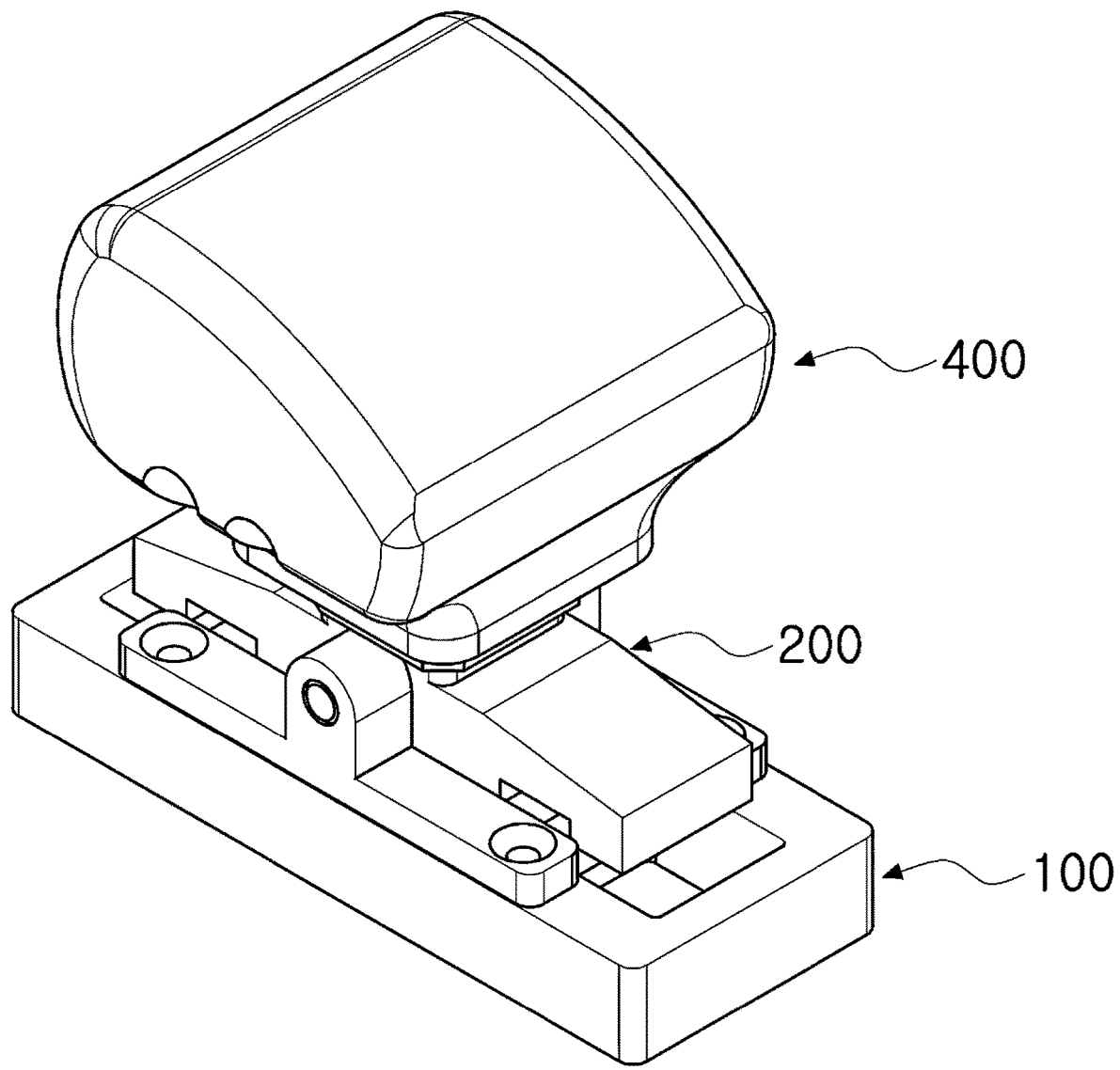
FIG. 1 is a perspective view showing a vehicle gear knob according to an embodiment of the present disclosure.

| Detailed Description for Reference Numerals |
|---|
| 10: R button |
| 20: D button |
| 30: N button |
| 100: lower support |
| 110: first groove |
| 120: second groove |
| 130: arm bracket |
| 140: seating groove |
| 150: receiving groove |
| 160: toothed wheel |
| 161: first screw thread |
| 200: upper support |
| 210: operating protrusion |

| Detailed Description for Reference Numerals |
|---|
| 220: male bracket |
| 230: coupling part |
| 240: through hole |
| 250: seating protrusion |
| 260: elastic spring |
| 270: rotation hole |
| 280: the rotation part |
| 281: guide locking groove |
| 281a: side wall |
| 281b: locking wall |
| 281c: inclined surface |
| 282: rotary guide |
| 283: rotary part |
| 283a: jig |
| 284: protrusion |
| 284a: second screw thread |
| 285: extension opening hole |
| 286: support hole |
| 287: upper step |
| 288: lower step |
| 289: inner fastening hole |
| 291: hinge |
| 292: rotary pressing part |
| 293: roller |
| 294: wire |
| 300: press operation part |
| 310: rotary bar |
| 320: locking bar |
| 330: push-knob |
| 331: push-protrusion |
| 340: gear rod |
| 341: locking step |
| 350: elastic member |
| 360: rod |
| 361: anti-separation protrusion |
| 370: step locking part |
| 380: elastic part |
| 400: grip part |
| 410: supporting part |
| 420: knob operation groove |
| 430: opening hole |
| 440: insertion hole |
| 450: outer fastening hole |

BEST MODE

The above and other objects, features and advantages of embodiments of the present disclosure, and a method of achieving them will be more clearly understood with reference to the embodiments described below in detail in conjunction with the accompanying drawings. However, the present disclosure is not limited to the following embodiments, and can be embodied in various forms different from each other, and embodiments of the present disclosure are presented to make complete disclosure of the present disclosure and help those who are ordinarily skilled in the art to which the present disclosure belongs understand the present disclosure. The present disclosure is only defined by the scope of the claims. The same reference numerals are used throughout the specification to designate the same or similar components.

In the following description, it is to be noted that, when the functions of conventional components and the detailed description of components related with the present disclosure may make the gist of the present disclosure unclear, a detailed description of those components will be omitted. Further, it should be noted that the terms and words used in the specification and the claims are terms defined in consideration of functions in the embodiments of the present disclosure, and should not be construed as being limited to ordinary meanings or dictionary definitions. Based on the principle that the inventor can appropriately define the concept of the terms in order to explain the present disclosure in the best way, it should be interpreted as meaning and concept consistent with the technical spirit of the present disclosure.

Meanwhile, the embodiments described in the specification and the configurations illustrated in the drawings are merely examples and do not exhaustively present the technical spirit of the present disclosure. Accordingly, it should be appreciated that there may be various equivalents and modifications that can replace the embodiments and the configurations at the time at which the present application is filed.

Hereinafter, prior to description with reference to the accompanying drawings, matters that are not necessary to reveal the gist of the present disclosure, that is, known configurations that can be added obviously by those skilled in the art, are not shown or described in detail.

First, before describing in detail various embodiments of the present disclosure with reference to the accompanying drawings, terms such as the orientation of components described in the following detailed description or shown in the drawings do not simply indicate that the terms must have a specific orientation, (e.g., "front", "rear", "left", "right", "upper", "lower", "above", "below", "transverse", "longitudinal", "front surface", "rear surface", "first side", "second side", "inside", and "outside"), and the description of the direction is to facilitate description between the components with reference to the accompanying drawings.

A vehicle gear knob according to the present disclosure is configured to replace the shift operating mechanism from the existing button method to a gear rod method or a rotary jog/shuttle method using the lever principle to correct gear-mishandling of a driver, to reduce the rate of accidents due to malfunction to contribute to safe driving, and to enable rapid replacement when change in speed is required in an emergency.

The vehicle gear knob is provided to replace the existing button type shift operating mechanism with the gear rod method or the rotary jog/shuttle method so as to prevent the driver from directly pushing and operating an R button 10, a D button 20, and an N button 30 adopted from the existing button method. The vehicle gear knob includes a lower support 100, an upper support 200, a press operation part 300, and a grip part 400.

At this point, the R button 10, the D button 20, and the N button 30 mean buttons of the gear shifting structure provided in the existing vehicle, and when each button is pushed, the button is inserted downward to allow gear shifting, and when each button is not pushed, each button remains protruding upward.

The lower support 100 provides a space that receives the R button 10, the D button 20, and the N button 30 adopted from the existing gear button method, and serves to support the vehicle gear knob so that the vehicle gear knob is installed in a gear console provided in a vehicle the present disclosure.

Specifically, a first groove 110 is formed in each of a front portion and a rear portion to guide each of the R button 10 and the D button 20 to be formed in a pair of first grooves 110, and the second groove 120 is formed between the pair of first grooves 110 to guide the N button 30.

The upper support 200 is provided on the lower support 100 to prevent the R button 10, the D button 20, and the N button 30 from being exposed.

This upper support 200 is coupled to the press operation part 300 and the grip part 400 to be described later so that the press operation part 300 and the grip part 400 are exposed upward of the upper support. When the driver operates the press operation part 300 or the grip part 400, the R button 10, the D button 20, or the N button 30 that are not exposed outward is operated.

Furthermore, the upper support 200 performs a casing function together with the lower support 100 in order to protect the mechanism structure that performs operation of the gear rod method or the rotary jog/shuttle method for replacing the existing button type transmission structure.

The press operation part 300 is coupled to the upper support 200 and performs a function of operating the N button 30 by a pressing force.

The press operation part 300 is preferably provided to penetrate the upper support 200, and is configured to be operated by a pressing force of the driver.

The grip part 400 is provided on the press operation part 300, and when the driver grips the grp part and applies a force thereto, the grip part performs a function of selectively operating the R button 10 or the D button 20 by using the lever principle.

In other words, through a process in which the driver pushes, pulls, or rotates the grip part 400 to be described below, the R button 10 or the D button 20 provided inside the lower support 100 and the upper support 200 is selectively operated.

By this structure, the existing button method gear shifting structure may be replaced with the gear rod method or the rotary jog/shuttle method using the lever principle, and the mechanism by the gear rod method and the rotary jog/shuttle method will be described in detail with reference to accompanying drawings.

First, the mechanism by the gear rod method will be described with reference to FIG. 1 to.

Figure 2:
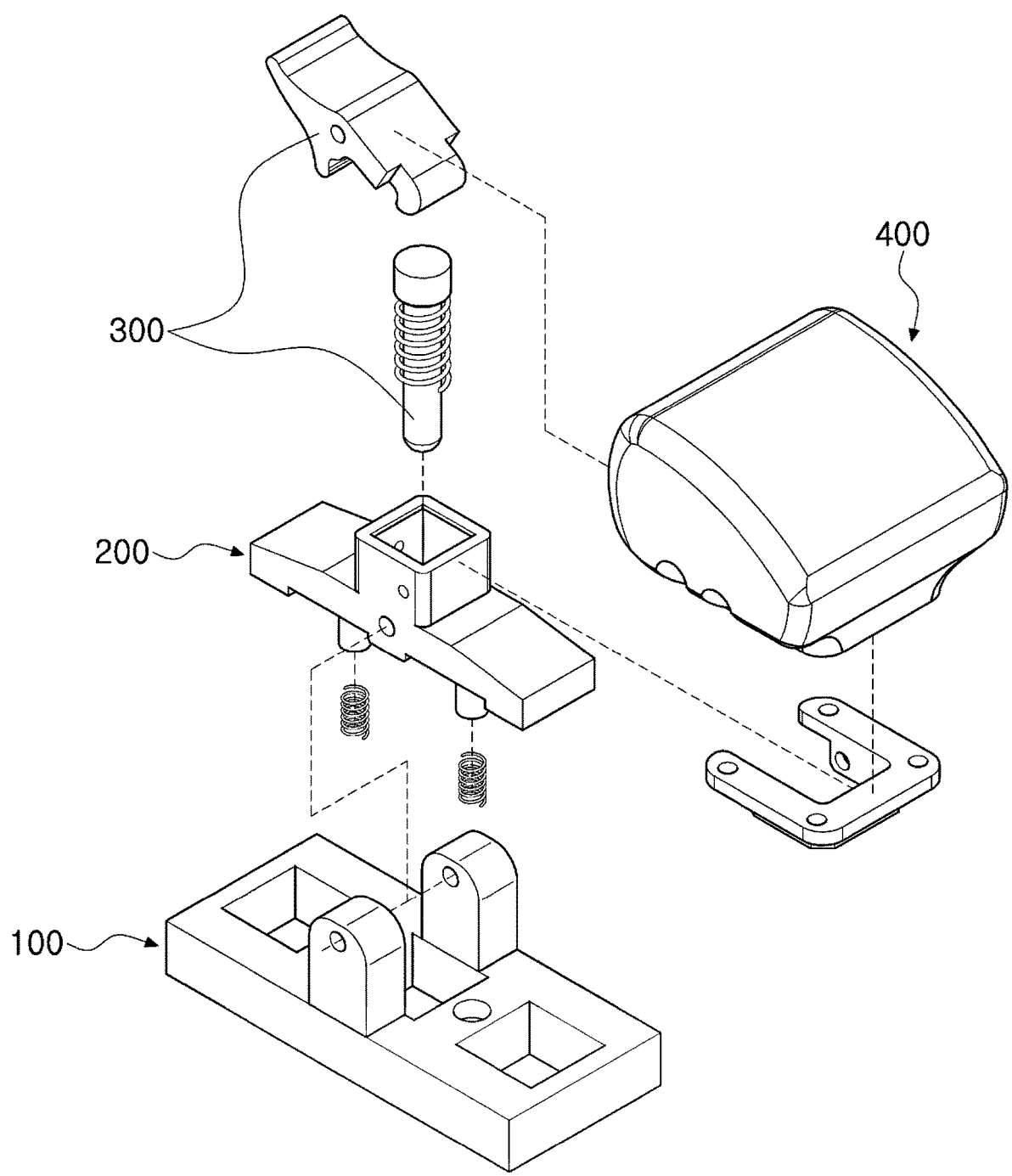
FIG. 2 is an exploded-perspective view showing the vehicle gear knob according to the embodiment of the present disclosure.

FIG. 1 is a perspective view showing the vehicle gear knob according to an embodiment of the present disclosure. FIG. 2 is an exploded-perspective view showing the vehicle gear knob according to the embodiment of the present disclosure.

In the vehicle gear knob according to the embodiment of the present disclosure, the gear rod method is configured for the driver to grip the grip part 400 to allow the R button 10 or the D button 20 to be selectively operated through pushing and pulling processes. The vehicle gear knob includes: the lower support 100 including the pair of first grooves 110 through which the R button 10 and the D button 20 are guided, respectively, and including the second groove 120 through which the N button 30 is guided; the upper support 200 provided on the lower support 100 to prevent the R button 10, the D button 20, and the N button 30 from being exposed; the press operation part 300 coupled to the upper support 200 to operate the N button 30 by a pressing force; and the grip part 400 provided on the press operation part 300, wherein when the driver grips the grip part and applies a pushing or pulling force thereto, the grip part allows the R button 10 or the D button 20 to be selectively operated by using the lever principle.

Figure 3:
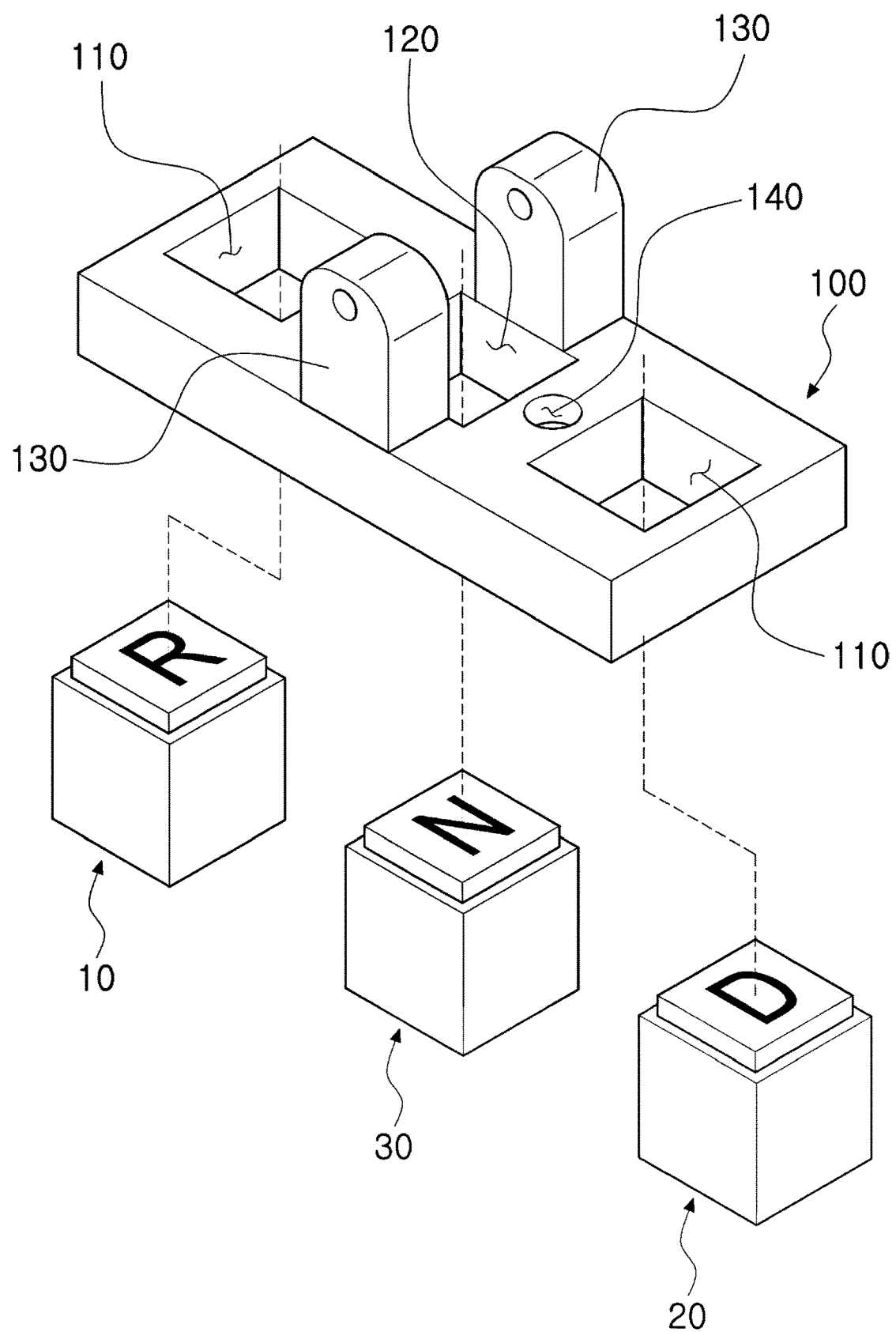
FIG. 3 is a partial-perspective view showing a lower support of the vehicle gear knob according to the embodiment of the present disclosure.
Figure 4:
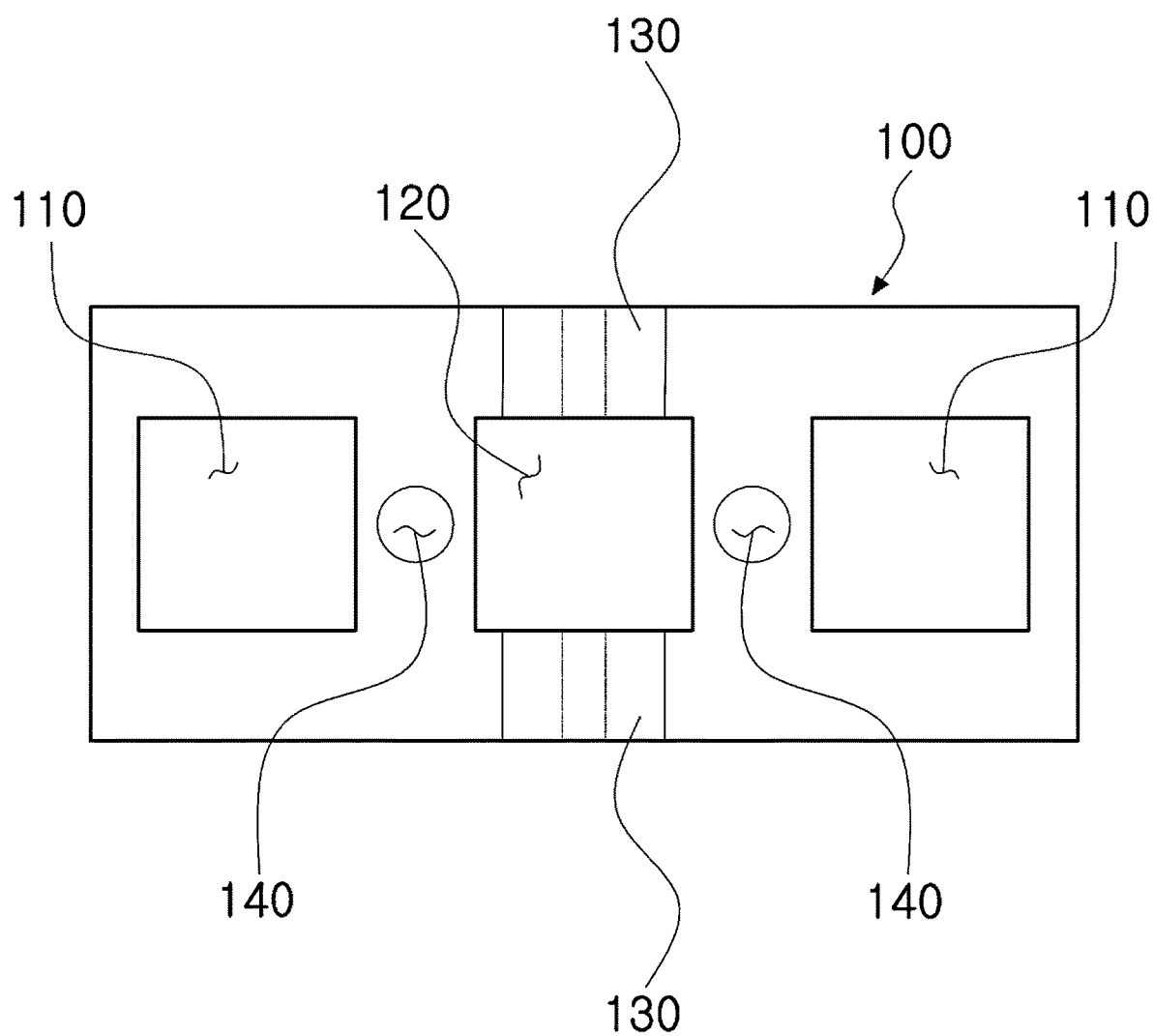
FIG. 4 is a plan view showing the lower support of the vehicle gear knob according to the embodiment of the present disclosure.
Figure 5:
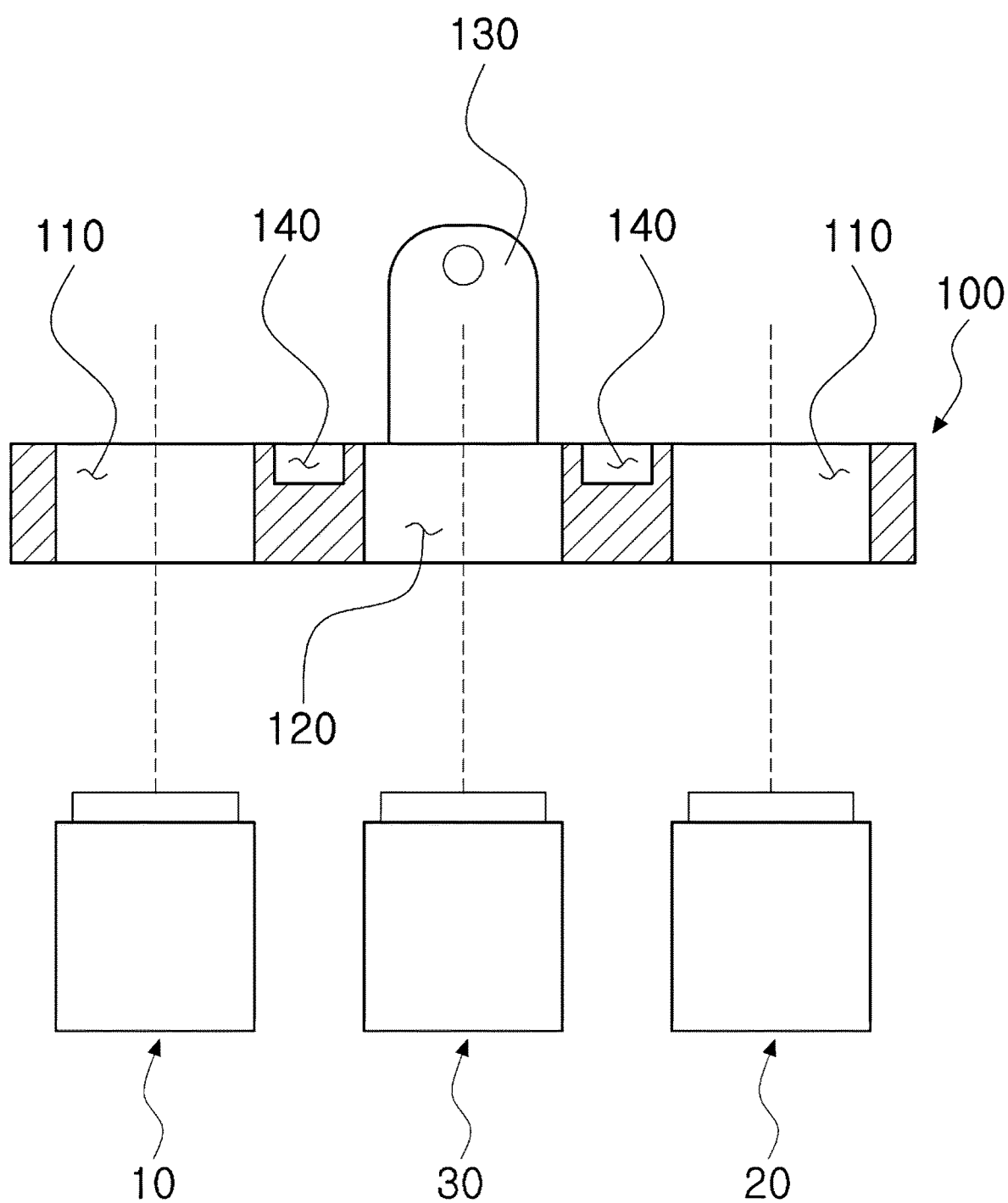
FIG. 5 is a side-sectional view showing the lower support of the vehicle gear knob according to the embodiment of the present disclosure.

FIG. 3 is a partial perspective view showing the lower support of the vehicle gear knob according to the embodiment of the present disclosure. FIG. 4 is a plan view showing the lower support of the vehicle gear knob according to the embodiment of the present disclosure. FIG. 5 is a side-sectional view showing the lower support of the vehicle gear knob according to the embodiment of the present disclosure.

The lower support 100 is formed in a shape in which the pair of first grooves 110 in which the R button 10 and the D button 20 are received, respectively, and the second groove 120 in which the N button 30 is received penetrate vertically the lower support 100, and the lower support 100 includes arm brackets 130 and seating grooves 140.

Referring to FIG. 3, the arm brackets 130 are formed in shapes protruding upward on left and right portions of an upper end of the lower support, and to which the upper support 200, which will be described below, is rotatable coupled.

The arm brackets 130 may include a pair of arm brackets, as shown in FIGS. 3 and 4.

Referring to FIGS. 4 and 5, each of the seating grooves 140 is formed in a shape depressed downward on an upper surface between each first groove 110 and the second groove 120, and provides a space in which each elastic spring 260 of the upper support 200, which will be described below, is received.

In other words, a pair of seating grooves 140 provided on a front portion and a rear portion, respectively, on the basis of a center shaft on which the N button 30 is formed, and the upper support 200 coupled to the lower support 100 to be rotatable forward or rearward by elastic forces of the elastic springs 260 supported by the seating grooves 140 is maintained in a parallel state to the lower support 100 when an external force is not applied.

Additionally, when the driver pushes or pulls the grip part 400, which will be described below, and an external force is applied thereto, the upper support 200 is rotated forward or rearward from the lower support 100, and is returned to an original position by the elastic springs 260 elastically supported by the seating grooves 140 to maintain in the parallel state thereof.

Figure 6:
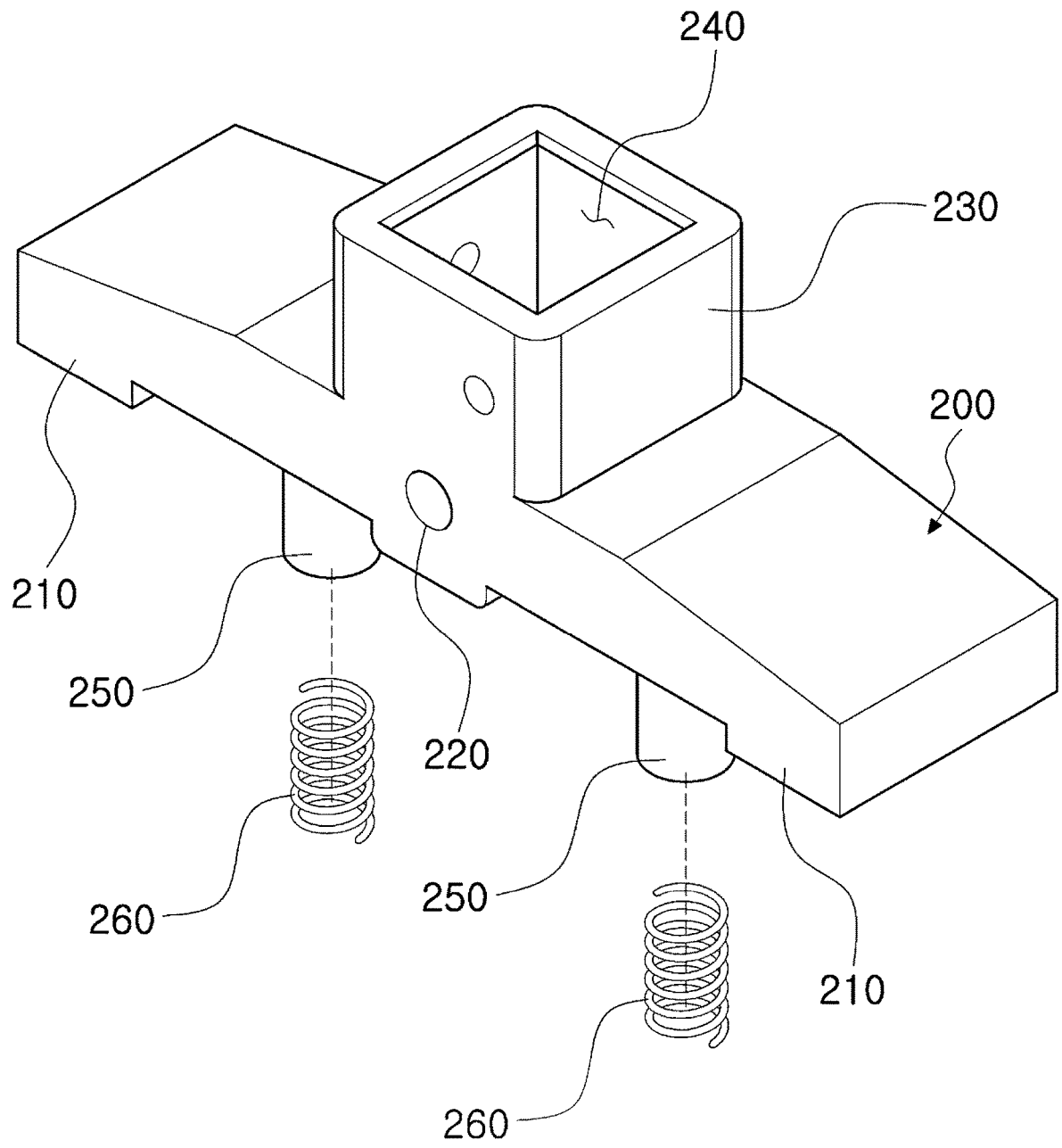
FIG. 6 is a perspective view showing an upper support of the vehicle gear knob according to the embodiment of the present disclosure.
Figure 7:
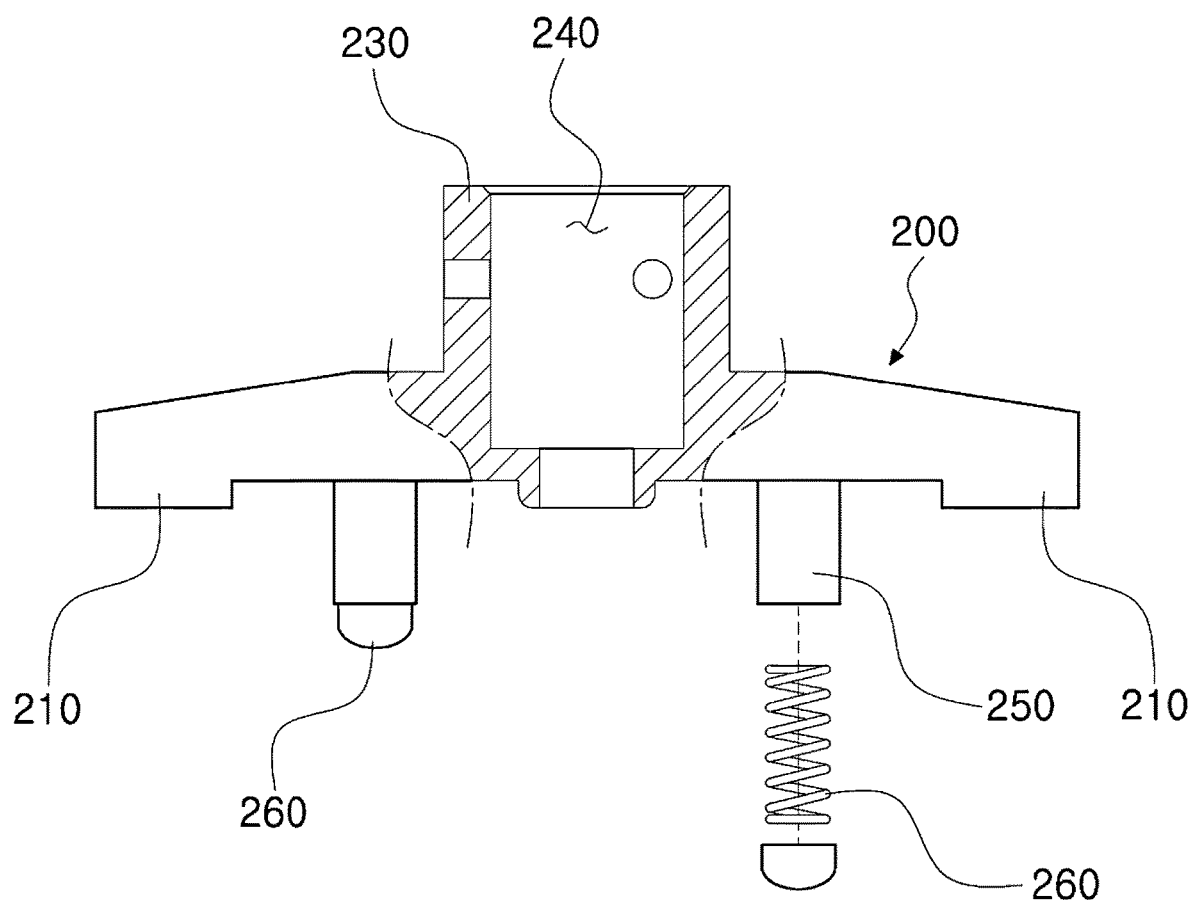
FIG. 7 is a side view showing the upper support of the vehicle gear knob according to the embodiment of the present disclosure.

FIG. 6 is a perspective view showing the upper support of the vehicle gear knob according to the embodiment of the present disclosure. FIG. 7 is a side view showing the upper support of the vehicle gear knob according to the embodiment of the present disclosure.

The upper support 200 is rotatably coupled on the lower support 100, and includes operating protrusions 210, a male bracket 220, a coupling part 230, a through hole 240, seating protrusions 250, and the elastic springs 260.

Referring to FIGS. 6 and 7, the operating protrusions 210 are formed in shapes protruding downward from a front portion and a rear portion of the upper support, respectively. When the upper support 200 is rotated against the lower support 100, the operating protrusions 210 serve to selectively operate the R button 10 or the D button 20 in response to a rotating direction of the upper support 200 by the lever principle.

As an example, when the driver grips and pushes the grip part 400, which will be descried below, the upper support 200 is rotated forward, and the operating protrusion 210 provided at the front portion is moved downward to press the R button 10.

As another example, when the driver grips and pulls the grip part 400, which will be described below, the upper support 200 is rotated rearward, and the operating protrusion 210 provided at the rear portion is moved downward to press the D button 20.

Accordingly, with reference to a rotating direction of the upper support 200 through the process in which the driver pushes and pulls the grip part 400, the R button 10 and the D button 20 may be selectively operated.

According to a design condition, a lower surface of each of the operating protrusions 210 may be formed to have an inclined surface that is inclined upward in an outward direction from a center shaft of the upper support 200.

In other words, each of the operating protrusions 210 may be formed in an inclined shape in which a lower surface rises gradually in a direction from a side where the operating protrusions are adjacent to each other toward an outward side.

Therefore, in the process in which the upper support 200 is rotated using the lever principle and the operating protrusions 210 presses the R button 10 or the D button 20, the inclined surface extends a contact area between an upper surface of each button and the lower surface of each operating protrusion 210, thereby achieving stable operation without malfunctions.

The male bracket 220 protrudes downward from a center portion of the upper bracket to be rotatably coupled to the pair of arm brackets 130.

The male bracket 220 may include a pair of male brackets so as to be coupled to the pair of arm brackets respectively, so that the through hole 240, which will be described below, may penetrate upper and lower portions of the upper support 200.

At this point, although a reference numeral is not given in the drawings, the pair of arm brackets 130 and the pair of male brackets 220 may be coupled to each other while sharing a shaft by a separate pin, bolt or the like.

As such, the upper support 200 is configured to be rotatable forward or rearward against the lower support 100 on the basis of the shaft.

The coupling part 230 is formed in a shape protruding upward on an upper end of the upper support.

The coupling part 230 couples the press operation part 300, which will be described below, to the upper support 200.

The through hole 240 is formed to penetrate a lower surface of the upper support 200 and an upper surface of the coupling part 230, and provides a space through which a gear rod 340 of the press operation part 300, which will be describe below, penetrates the through hole 240.

Referring to FIG. 7, each of the seating protrusions 250 is formed in a shape protruding downward from a lower surface between each operating protrusion 210 and the male bracket 220.

The seating protrusions 250 include a pair of seating protrusions to be formed in positions corresponding to the seating grooves 140 formed at the lower support 100.

The elastic springs 260 are fitted in and coupled to the seating protrusions 250, and when the upper support 200 is rotated against the lower support 100, each elastic spring is fitted in each seating groove 140 and serves an elastically supporting function in a direction opposite to rotation.

Figure 8:
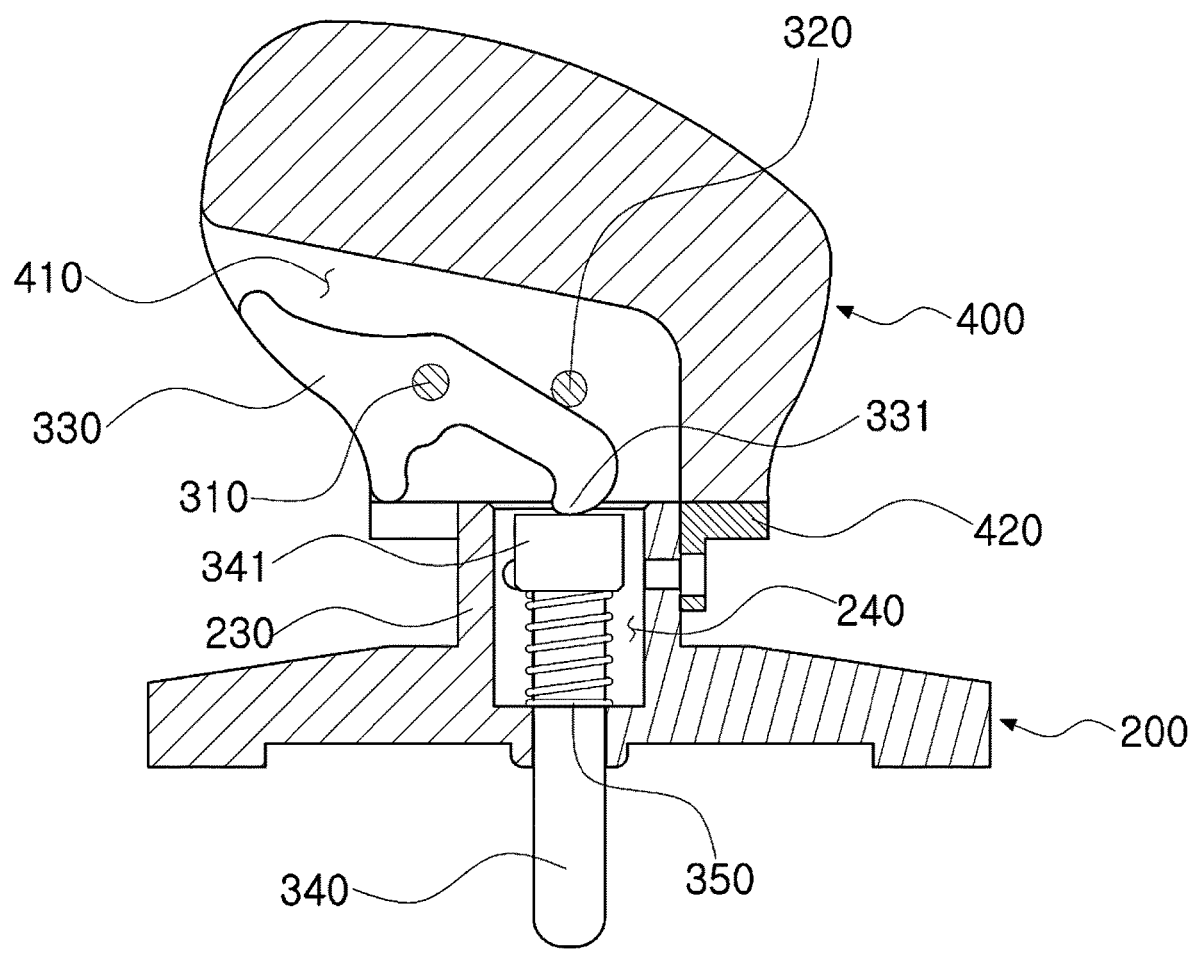
FIG. 8 is a side-sectional view showing a press operation part and a grip part of the vehicle gear knob according to the embodiment of the present disclosure.
Figure 9:
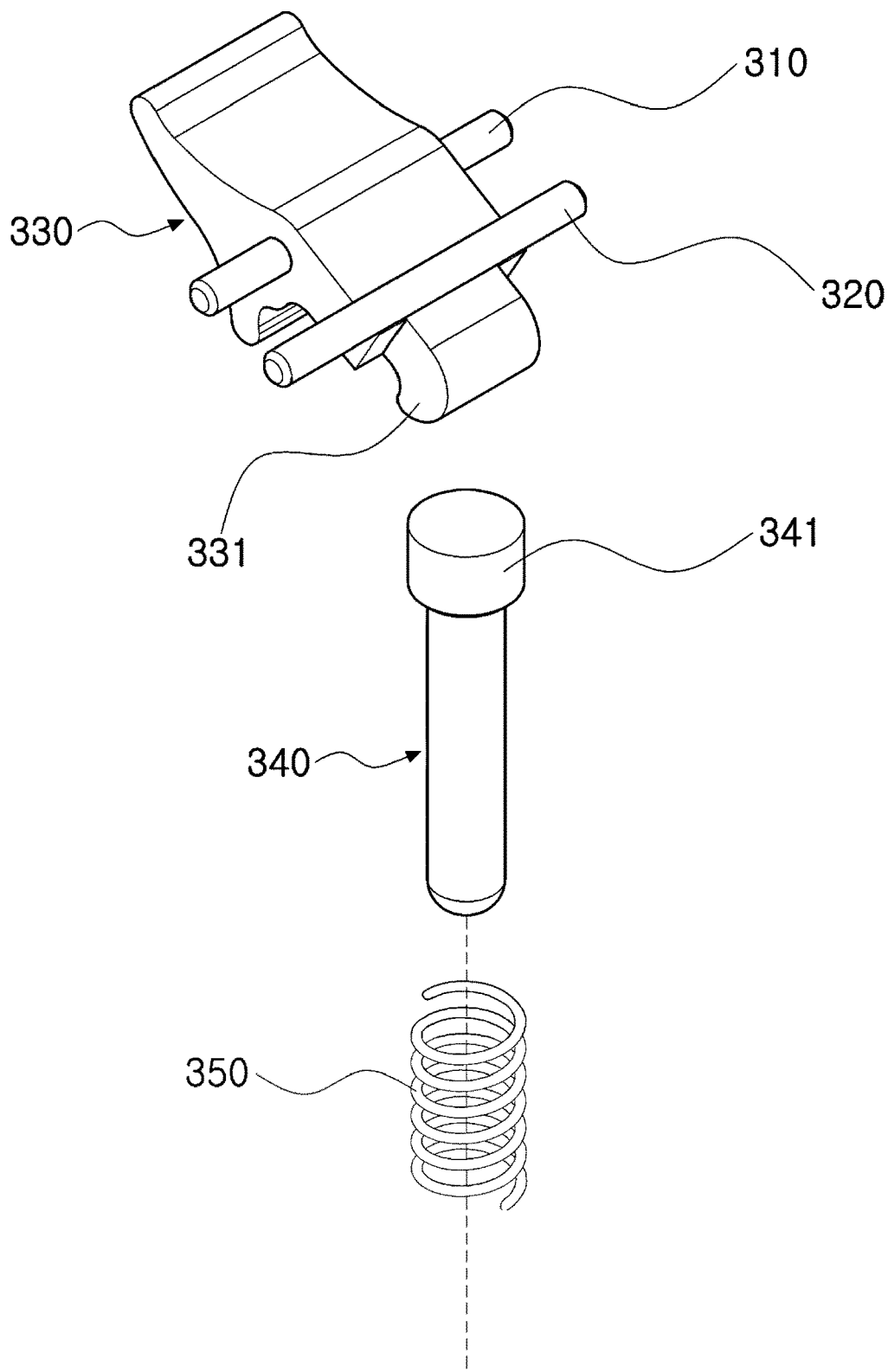
FIG. 9 is an exploded-perspective view showing the press operation part of the vehicle gear knob according to the embodiment of the present disclosure.

FIG. 8 is a side-sectional view showing the press operation part and the grip part of the vehicle gear knob according to the embodiment of the present disclosure. FIG. 9 is an exploded-perspective view showing the press operation part of the vehicle gear knob according to the embodiment of the present disclosure.

The press operation part 300 is coupled to the upper support 200 to serve a function of operating the N button 30 by a pressing force. The press operation part 300 includes a rotary bar 310, a locking bar 320, a push-knob 330, the gear rod 340, and an elastic member 350.

The rotary bar 310 is provided inside a knob operation groove 420 formed in the grip part 400, which will be described below, and is formed in a shape having a major axis length in leftward and rightward directions.

The rotary bar 310 is coupled to the push-knob 330 to allow rotation of the push-knob 330, which will be described above.

The locking bar 320 is provided inside the knob operation groove 420 formed in the grip part 400, which will be described below, and is provided to be spaced apart from a rear surface of the rotary bar 310, and is formed in a shape having a major axis length in the leftward and rightward directions.

The locking bar 320 serves a function of limiting a degree of rotation of the push-knob 330 by supporting an upper portion of the push-knob 330 in a process in which the push-knob 330, which will be described below, is rotated on the rotary bar 310.

The push-knob 330 is provided inside the knob operation groove 420 formed in the grip part 400, which will be described below, and is rotatably coupled to the rotary bar 310.

At this point, in describing the push-knob 330 with reference to FIGS. 8 and 9, the knob operation groove 420 formed in the grip part 400 is formed in a shape penetrating a front surface and a rear surface of the grip part 400, and one portion of the push-knob 330 is exposed through the front surface of the knob operation groove 420 and a push-protrusion 331 formed in a shape protruding downward is provided on a second portion thereof.

At this point, the push-protrusion 331 is located above the through hole 240 formed in the coupling part 230, and is moved upward or downward in the process in which the push-knob 330 is rotated to be inserted into the through hole 240 or ejected therefrom.

For example, when the push-knob 330 is rotated, the push-protrusion 331 is inserted into the through hole 240 and presses the gear rod 340 provided in the through hole 240 downward, and then the gear rod 340 presses the N button 30 to achieve operation of the N button 30.

The gear rod 340 penetrates the through hole 240 to be vertically slidable, and the push-protrusion 331 of the push-knob 330 is located at an upper portion of the gear rod, and a lower portion thereof is located above the N button 30 received in the second groove 120, and the gear rod 340 includes the locking step 341 protruding outward on an outer circumferential surface of an upper end thereof.

Since the gear rod 340 is vertically slidable, when the driver pulls the push-knob 330 upward, the push-protrusion 331 of the push-knob 330 rotated on the rotary bar 310 is moved downward by the lever principle. As such, the gear rod 340 is pressed to slide downward, so that the gear rod 340 operates the N button 30.

The elastic member 350 is inserted into the through hole 240 to wrap an outer circumferential surface of the gear rod 340, and serves to elastically support the gear rod 340 upward, the gear rod 340 penetrating the through hole 240.

Preferably, an upper end of the elastic member 350 is supported by a lower end of the locking step 341 formed on the gear rod 340, and a lower end thereof is supported by a bottom surface of the through hole 240 formed in the upper support 200, so that the elastic member 350 elastically supports the gear rod 340 upward.

As such, when the driver rotates the push-knob 330 to operate the N button 30, the gear rod 340 is moved upward by an elastic force of the elastic member 350 to be returned to an original position thereof.

At this point, the elastic member 350 may be formed in a spring shape as shown in the accompanying drawings.

Figure 10:
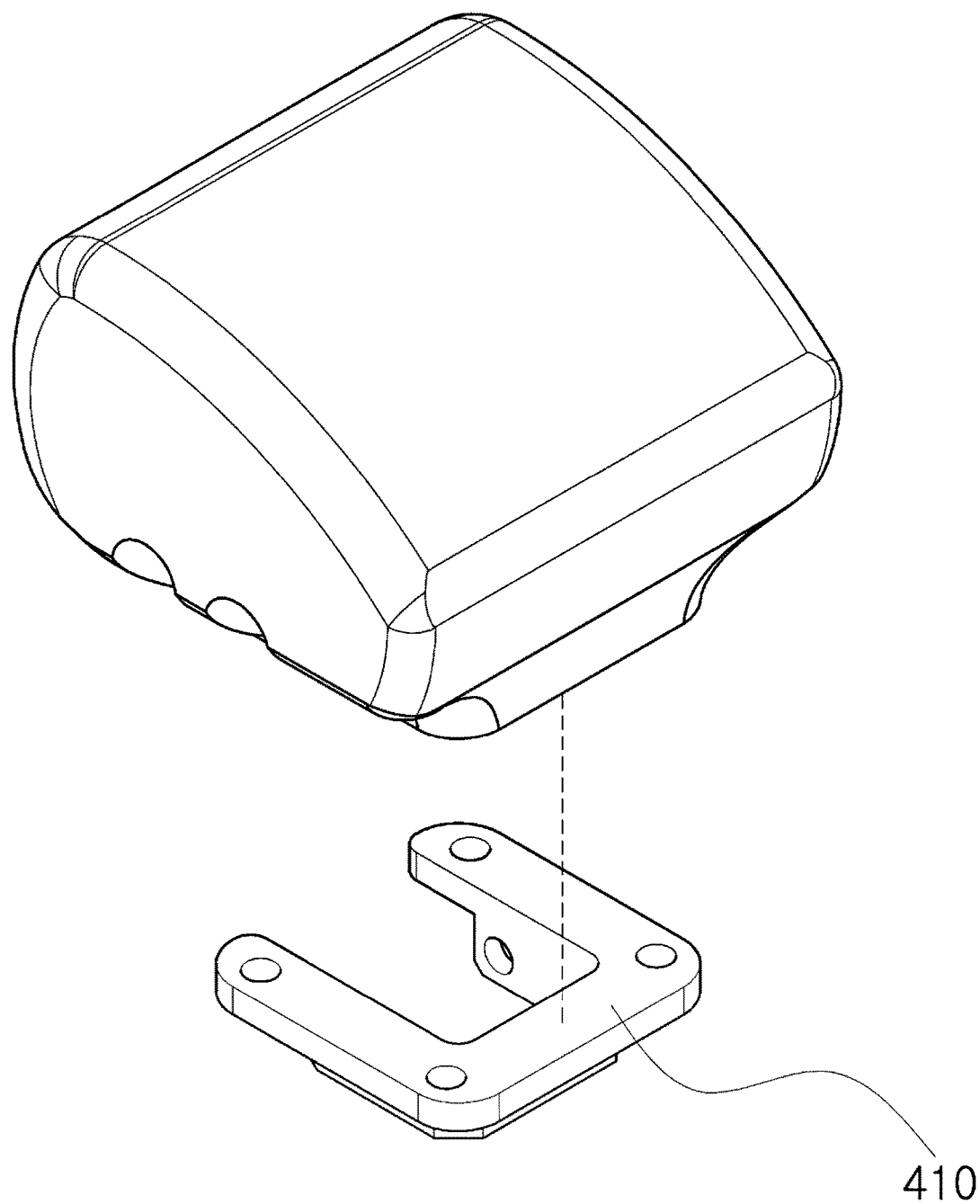
FIG. 10 is an exploded-perspective view showing the grip part of the vehicle gear knob according to the embodiment of the present disclosure.

FIG. 10 is an exploded-perspective view showing the grip part of the vehicle gear knob according to the embodiment of the present disclosure.

The grip part 400 is provided on the press operation part 300, and is configured to achieve gear shifting while being gripped by the driver. The grip part 400 includes a supporting part 410 and the knob operation groove 420.

When a force pushing or pulling the grip part 400 is applied to the grip part 400, the grip part 400 allows the R button 10 or the D button 20 to be selectively operated, by using the lever principle.

At this point, although not shown in detail in the drawings, the grip part 400 may be formed in various shape of gear knobs provided in the conventional vehicle.

For example, in order to improve the feeling of gripping the grip part, the entire grip part may be formed in a curved surface, or a part of an upper portion of the grip part may be inclined forward in a bent shape.

Furthermore, the grip part may be made of various materials such as leather, carbon, or synthetic resins such as plastic, etc.

The supporting part 410 is provided to allow the grip part 400 to be coupled to an upper portion of the coupling part 230 of the upper support 200, and the supporting part 410 is coupled to a lower portion of the grip part 400.

In describing with reference to FIG. 10, the supporting part 410 has a '⊂' shape in which a front surface is open to cover a part of the upper portion of the coupling part 230, and the outer circumferential surface of the upper portion of the coupling part 230 is inserted through the open space of the supporting part.

At this point, it is certain that coupling between the supporting part 410 and the coupling part 230 and coupling between the supporting part 410 and the grip part 400 may be performed in a bolting coupling manner.

The knob operation groove 420 is formed by penetrating a front surface and a lower portion of the grip part 400, and provides a space in which the rotary bar 310, the locking bar 320, and the push-knob 330 are provided.

The knob operation groove 420 exposes a part of the push-knob 330 to the outside space of the grip part 400 through the front open space thereof, so that the driver pulls the exposed portion upward to achieve an operation of the N button 30.

Through this structure, the vehicle gear knob according to the embodiment of the present disclosure is configured such that when the driver pushes the grip part 400, the upper support 200, the press operation part 300, and the grip part 400 are rotated forward from the lower support 100, so that front one of the operating protrusions 210 operates the R button 10 to change the vehicle into a state in which the vehicle can be moved rearward. On the contrary, when the driver pulls the grip part 400, the upper support 200, the press operation part 300, and the grip part 400 are rotated rearward from the lower support 100, so that remaining rear one of the operating protrusions 210 operates the D button 20 to change the vehicle into a state in which the vehicle can be moved forward.

As such, from the existing button method, the shift operating mechanism is replaced with the gear rod method using the lever principle, so that intuitive gear shifting is performed. Accordingly, it is possible to correct gear-mishandling during operation of the existing button gear, and to reduce the rate of accidents due to malfunction to contribute to safe driving.

Hereinbelow, referring to FIGS. 11 to 22, the mechanism by the rotary jog/shuttle method will be described.

First, it noted that redundant parts with contents described in advance in FIGS. 1 to 10 are not described.

Figure 11:
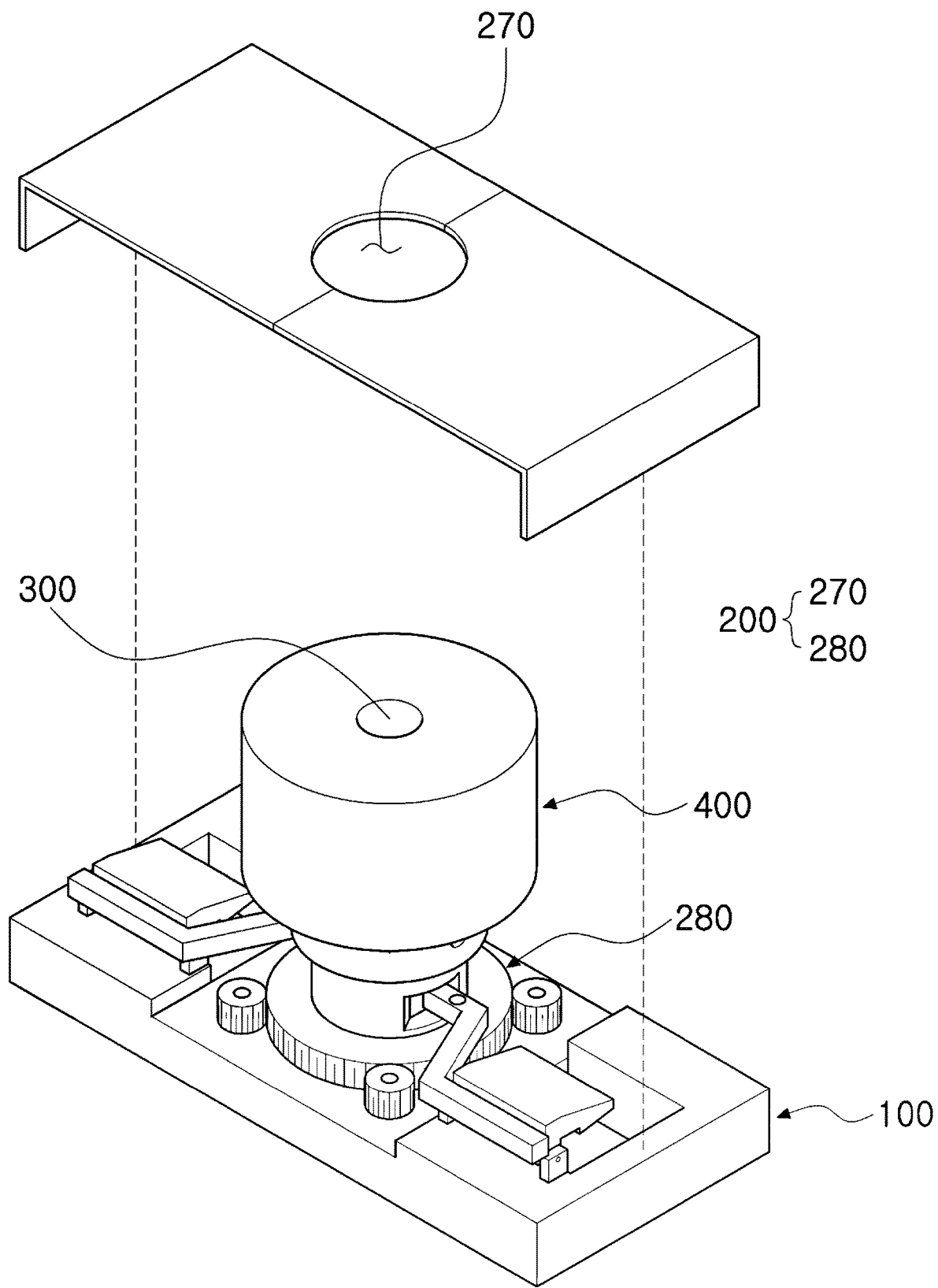
FIG. 11 is a perspective view showing the vehicle gear knob according to a second embodiment of the present disclosure.
Figure 12:
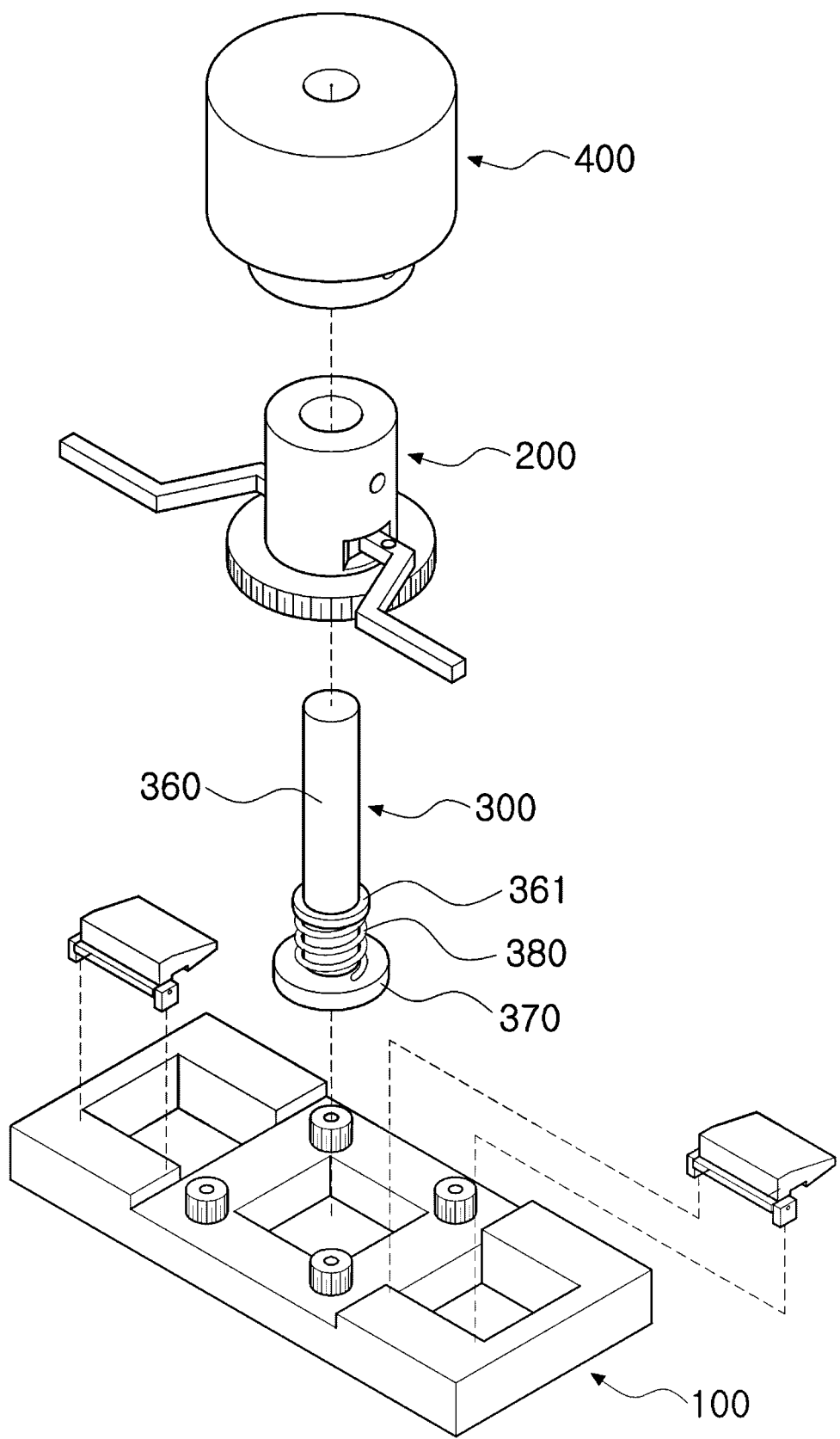
FIG. 12 is an exploded-perspective view showing the vehicle gear knob according to the second embodiment of the present disclosure.

FIG. 11 is a perspective view showing the vehicle gear knob according to a second embodiment of the present disclosure. FIG. 12 is an exploded-perspective view showing the vehicle gear knob according to the second embodiment of the present disclosure.

In the vehicle gear knob according to the second embodiment of the present disclosure, through the process in which the driver grips the grip part 400 and then rotates the grip part 400, the rotary jog/shuttle method allows the R button 10 or the D button 20 to be selectively operated. The vehicle gear knob includes: the lower support 100 including the pair of first grooves 110 through which the R button 10 and the D button 20 are guided, respectively, and including the second groove 120 through which the N button 30 is guided; the upper support 200 provided on the lower support 100 to prevent the R button 10, the D button 20, and the N button 30 from being exposed; the press operation part 300 coupled to the upper support 200 to operate the N button 30 by a pressing force; and the grip part 400 provided on the press operation part 300, wherein when the driver grips the grip part 400 or applies a force to rotate the grip part in a first direction or a second direction, the grip part 400 allows the R button 10 or the D button 20 to be selectively operated by the lever principle.

Figure 13:
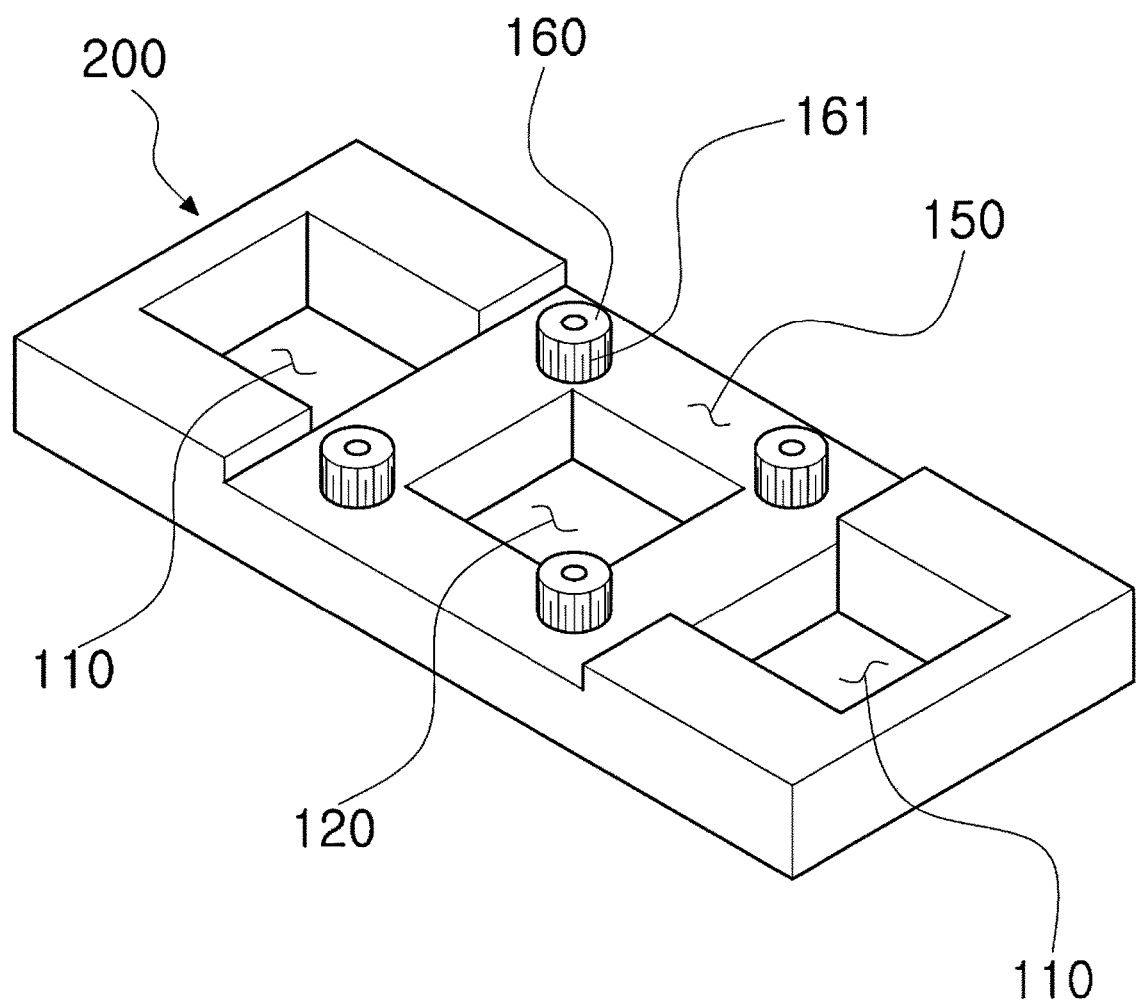
FIG. 13 is a partial-perspective view showing the lower support of the vehicle gear knob according to the second embodiment of the present disclosure.
Figure 14:
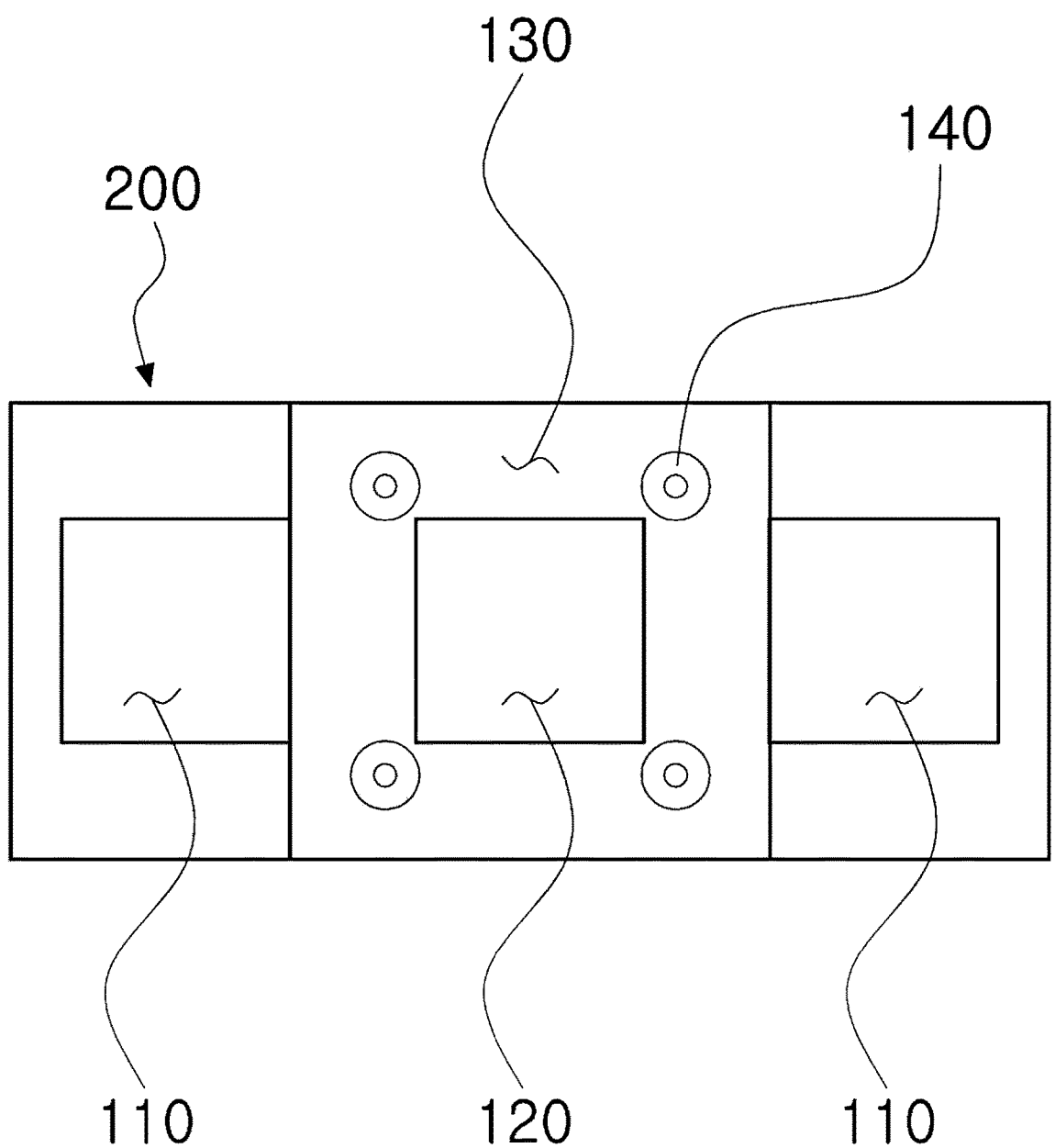
FIG. 14 is a plan view showing the lower support of the vehicle gear knob according to the second embodiment of the present disclosure.

FIG. 13 is a partial-perspective view showing the lower support of the vehicle gear knob according to the second embodiment of the present disclosure. FIG. 14 is a plan view showing the lower support of the vehicle gear knob according to the second embodiment of the present disclosure.

The lower support 100 is formed in the shape in which the pair of first grooves 110 in which the R button 10 and the D button 20 are received, respectively, and the second groove 120 in which the N button 30 is received penetrate the lower support 100 vertically, and the lower support 100 includes a receiving groove 150 and toothed wheels 160.

In describing with reference to FIG. 13, the receiving groove 150 has a downward depressed shape on a part of a upper center portion of the lower support, and the receiving groove 150 provides a space in which a part of a lower portion of a rotation part 280 of the upper support 200, which will be described below, as inserted.

The toothed wheels 160 are provided on the receiving groove 150, and each of the toothed wheels 160 is provided to be rotatable on a vertical shaft thereof and has a first screw thread 161 on an outer circumferential surface thereof.

When a part of the lower portion of the rotation part 230 is inserted into the receiving groove 150, the first screw thread 161 of each of the toothed wheels 160 is engaged with a second screw thread 234a formed on the lower portion of the rotation part 280 so that a rotation force can be shared therebetween.

At this point, the toothed wheels 160 may include a plurality of toothed wheels 160 as shown in FIG. 14.

Preferably, the plurality of toothed wheels 160 may be provided to be spaced outward from each other on the basis of a center shaft of the lower support 100 so as to be engaged with the second screw thread 284a formed on the outer circumferential surface of the lower portion of the rotation part 280, the rotation part 280 being coupled to the lower support with having a center shaft same as the center shaft of the lower support 100.

According to a design condition, as shown in FIG. 14, the toothed wheels 160 engaged with the second screw thread 284a of the rotation part 280 may include 4 toothed wheels, and the 4 toothed wheels 160 may be provided on edge portions of the space with the receiving groove 150, respectively.

As such, when the driver rotates the grip part 400, which will be describe below, during rotation of the rotation part 280 rotated together with the grip part 400, the rotation part 280 is engaged with the 4 toothed wheels 160 to share the rotation force, and as the rotation part 280 is rotated while being engaged with the toothed wheels 160, the rotation part 280 is stably to prevent eccentricity from occurring, and therefore, the driver can perform precise manipulation without shaking of the grip part 400.

Figure 15:
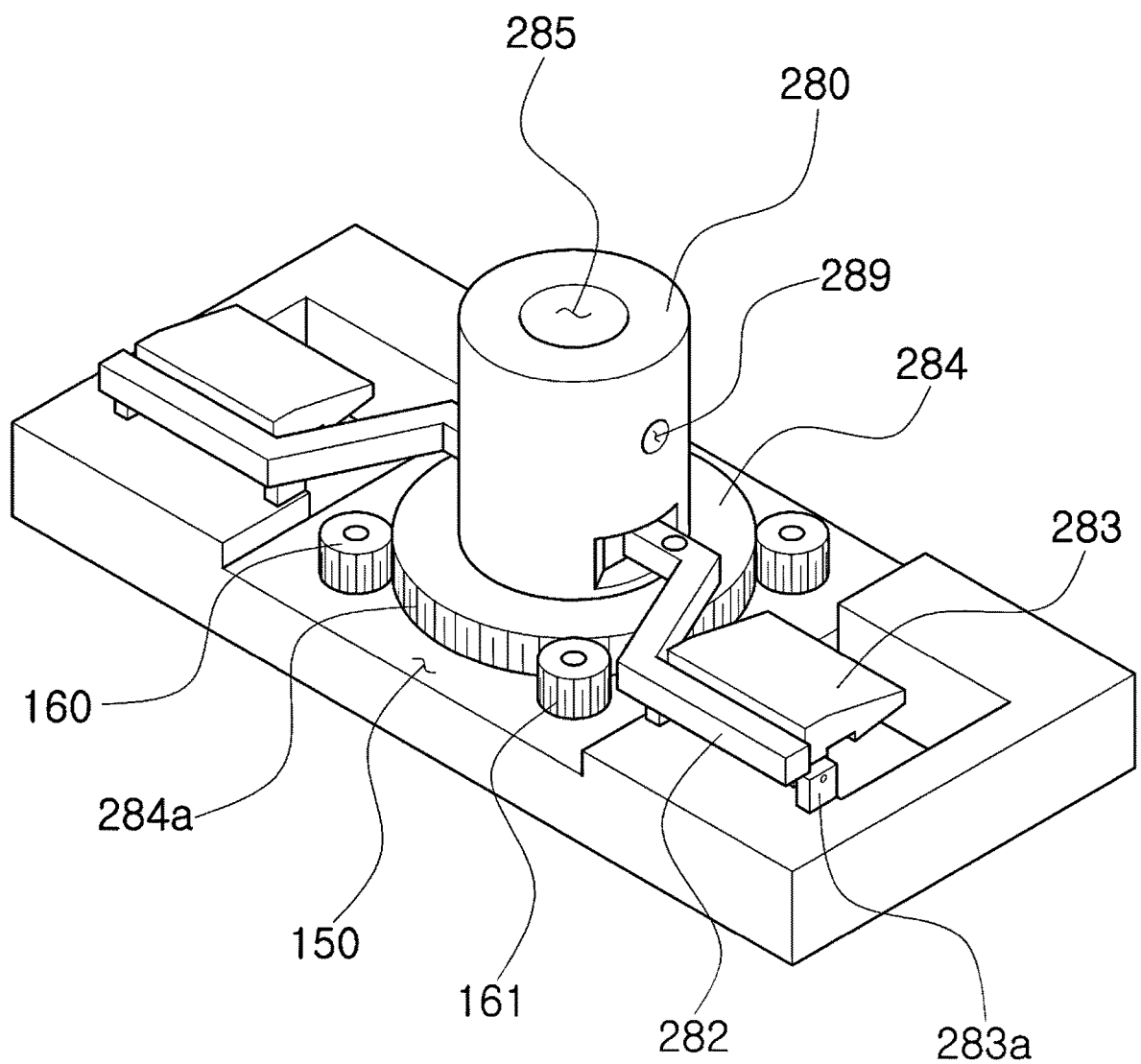
FIG. 15 is a perspective view showing the upper support of the vehicle gear knob according to the second embodiment of the present disclosure.
Figure 16:
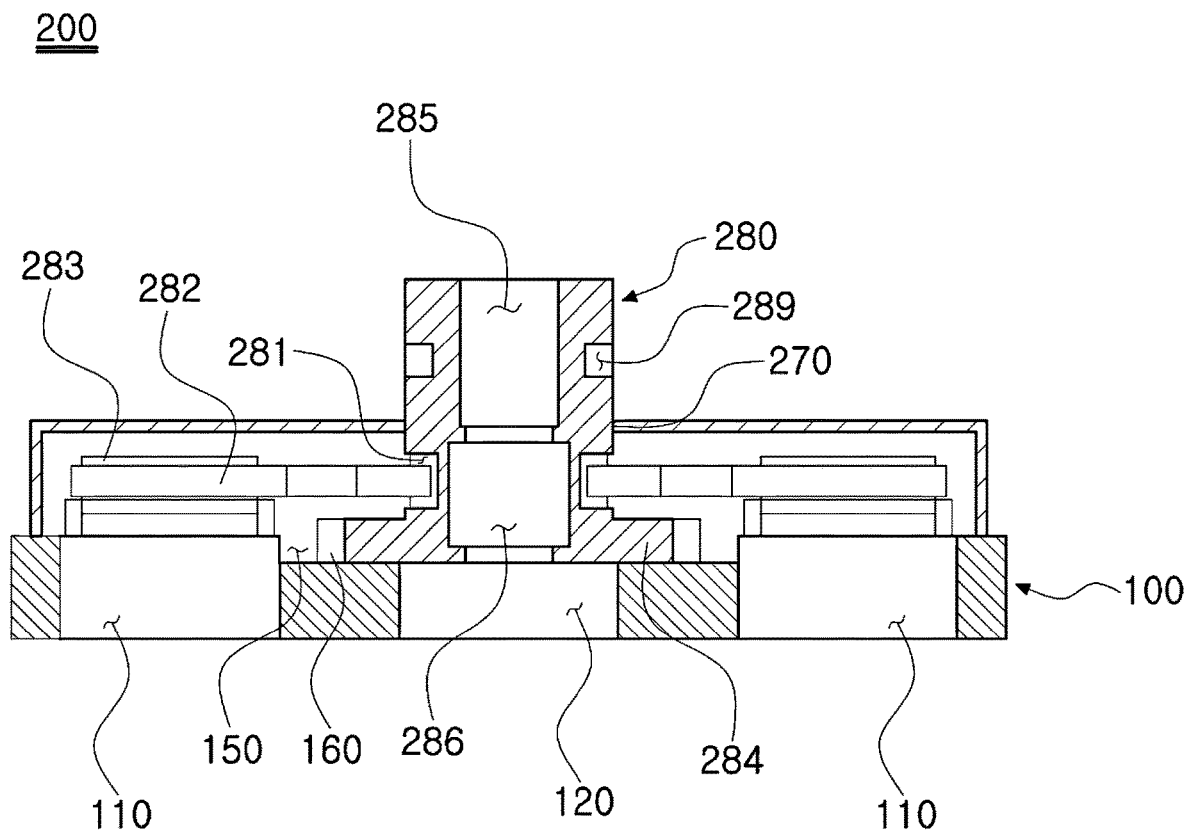
FIG. 16 is a side-sectional view showing the upper support of the vehicle gear knob according to the second embodiment of the present disclosure.

FIG. 15 is a perspective view showing the upper support of the vehicle gear knob according to the second embodiment of the present disclosure. FIG. 16 is a side-sectional view showing the upper support of the vehicle gear knob according to the second embodiment of disclosure.

The upper support 200 is provided on the lower support 100, and when the upper support 200 is rotated together with rotation of the grip part 400, which will be described below, the upper support 200 allows the R button 10 or the D button 20 to be operated, by the lever principle, and the upper support 200 includes a rotation hole 270 and the rotation part 280.

The rotation hole 270 is formed by penetrating the top and the bottom of a center portion of the upper support, and the rotation part 280, which will be described below, penetrates the rotation hole 270 to be rotatable.

The rotation part 280 penetrates the rotation hole 270 to be rotatable, and the lower portion of the rotation part 280 is fitted into and seated in the receiving groove 150.

This rotation part 280 is configured to coupled, at an upper portion thereof, to the grip part 400, which will be described, to share the rotation force.

In other words, when the driver grips and then rotates the grip part 400, the rotation part 280 is rotated together.

Moreover, the rotation part 280 is provided to allow gear shifting by the rotary jog/shuttle method, and the configuration for selectively operating the R button 10 or the D button 20 is provided inside the upper support 200.

Specifically, the rotation part 280 includes a guide locking groove 281, a rotary guide 282, a rotary part 283, a protrusion 284, an extension opening hole 285, an elastic support hole 286, an upper step 287, a lower step 288, and an inner fastening hole 289.

Figure 17:
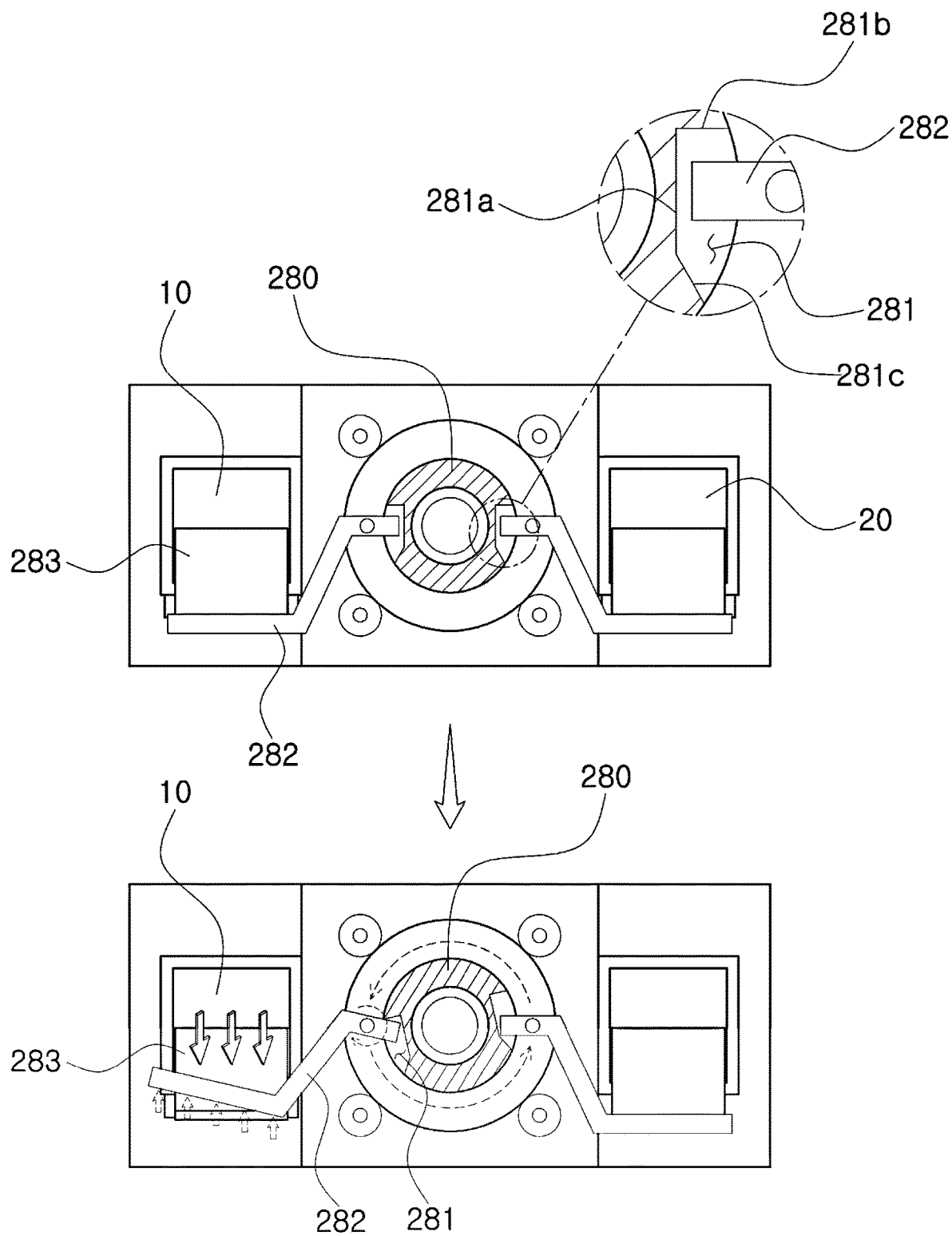
FIG. 17 is a partial plan-sectional view showing an example of operation of a rotary guide of the vehicle gear knob according to the second embodiment of the present disclosure.

FIG. 17 is a partial plan-sectional view showing an example of operation of the rotary guide of the vehicle gear knob according to the second embodiment of the present disclosure.

The guide locking groove 281 is formed in an inward recessed shape on the outer circumferential surface of the rotation part 280, and includes a pair of guide locking grooves 281 formed on a front surface and a rear surface of the rotation part 280, respectively, and serves to rotate the rotary guide 282 by the rotated rotation part 280 as a part of the rotary aide 282, which will be described below, is inserted into each guide locking groove 281.

At this point, as shown in FIG. 17, the guide locking grooves 281 are disposed symmetrically to each other on the basis of a vertical section including the center shaft of the rotation part 280.

For this, in describing in detail with reference to FIG. 17, each of the guide locking grooves 281 includes a side wall 281a close to the center shaft of the rotation part 280, a locking wall 281b connected to the outer circumferential surface of the rotation part 280 in a shape perpendicular to a first portion of the side wall 281a, and an inclined surface 281c connected to the outer circumferential surface of the rotation part in a shape inclined from a second portion of the side wall 281a.

The rotary guide 282 includes a pair of rotary guides 282 so that a part of each of the pair of rotary guides is inserted into each of the pair of guide locking grooves 281, and remaining parts of the pair of rotary guides extend in forward and rearward directions, respectively.

The rotary guide 282 is provided to be rotatable on a vertical shaft thereof, and the part inserted into the guide locking groove 281 is brought into contact with the locking wall 281b by rotation of the rotation part 280 so as to rotate the rotary guide 282.

With the configuration, in describing an example of operation of the rotary guide with reference to FIG. 17, when the driver rotates the grip part 400, which will be described below, the rotation part 280 coupled to the grip part 400 is rotated together with the grip part 400, and according to a rotated direction of the rotation part 280, the locking wall 281b formed in the guide locking groove 281 is brought into contact with the rotary guide 282 to rotate the rotary guide 282.

For example, as shown in FIG. 17, when the rotation part 280 is rotated counterclockwise, among the pair of guide locking grooves 281, the locking wall 281b of the guide locking groove 281 formed at the front surface side is brought into contact with the rotary guide 282 formed at the front surface side to rotate the rotary guide 282 formed at the front surface.

At this point, a contact between the rotary guide 282 formed at the rear surface side and the inclined surface 281c of the guide locking groove 281 is prevented by the inclined surface 281c, so that the rotary guide 282 is not rotated.

On the contrary, the rotation part 280 is rotated clockwise, among the pair of the rotary guides 282, the rotary guide 282 at the front surface side is maintained in a stop state, and the rotary guide 282 at the rear surface side is rotated.

As such, according to the rotated direction of the rotation part 280, the pair of rotary guides 282 provided at the front surface side and the rear surface side surface be selectively rotated.

Figure 18:
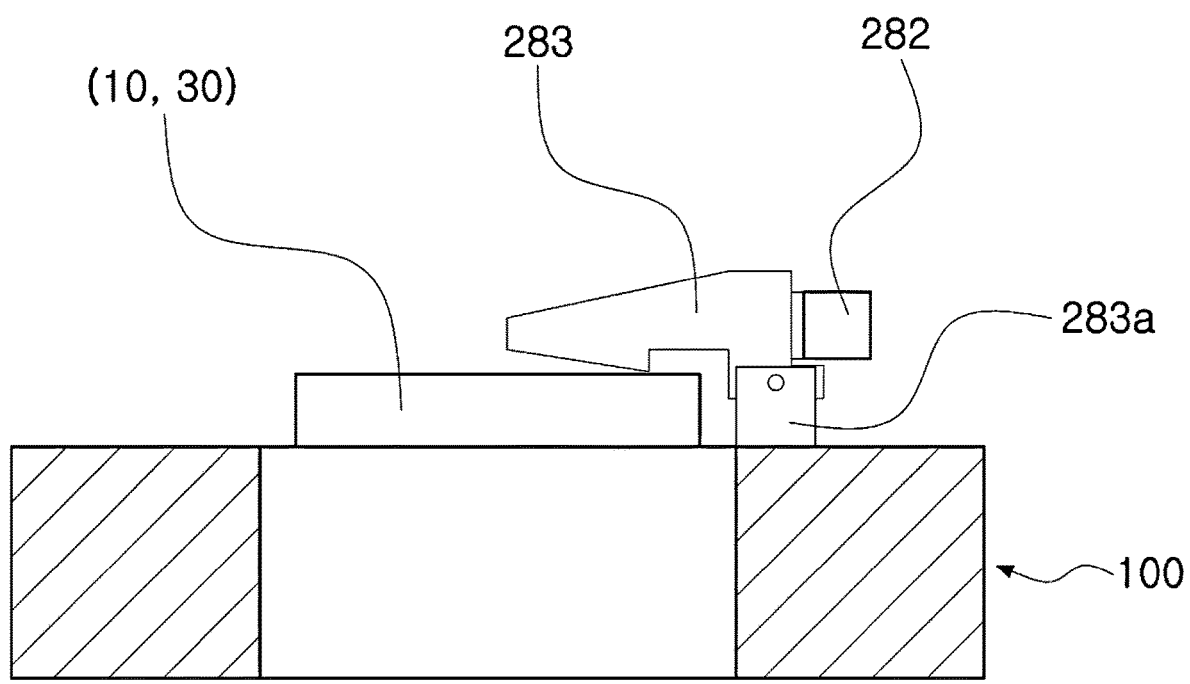
FIG. 18 is a partial front-sectional view showing an example of operation of a rotary part of the vehicle gear knob according to the second embodiment of the present disclosure.

FIG. 18 is a partial front-sectional view showing an example of operation of a rotary part of the vehicle gear knob according to the second embodiment of the present disclosure.

The rotary part 283 includes a jig 283a at a side surface with each first groove 110, and is provided to be rotatable leftward and rightward by the jig 283a. When the rotary guide 282 is rotated, the rotary part 283 is brought into contact with the rotary guide 282 to be rotated together.

In other words, the rotary guide 282 is rotated leftward and rightward on the vertical shaft, and the rotary part 283 is rotated upward and downward from the jig 283a on a front-rear shaft.

According to the configuration, in describing an example of operation of the rotary part 283 with reference to FIG. 18, when the rotary guide 282 is rotated by rotation of the rotation part 280 as shown in FIG. 17, the rotary guide 282 pushes a side surface of the rotary part 283 while being rotated, and the rotary part 283 is rotated downward, thereby pressing the R button 10 or the D button 20 to allow operation thereof.

For example, as shown in FIG. 17, when the rotation part 280 is rotated counterclockwise, a part of the rotary guides 282 locked by the guide locking groove 281 is rotated toward a first side, and a remaining part of the rotary guide 282 in the outward extending shape is rotated toward a second side.

At this point, as shown in FIG. 18, the rotary guide 282 rotated in the second direction is brought into contact with the rotary part 283 rotatably coupled to the jig 283a to push the rotary part 283 from the first side to the second side, so that the rotary part 283 is rotated downward.

As such, a lower surface of the rotary part 283 presses the R button 10, thereby allowing operation of the R button 10.

On the contrary, when the rotation part 280 is rotated counterclockwise, by the same mechanism, the rotary guide 282 and the rotary part 283 at the rear surface side are rotated together to press the D button 20, thereby allowing operation of the D button 20.

According to a design condition, the lower surface of the rotary part 283 to be brought into contact with the upper surface of the R button 10 or the D button 20 may be formed in an inclined surface that rises upward in a direction from the first side to the second side of the upper support 200, as shown in FIG. 18.

In other words, each of the pair of rotary parts 283 has the lower surface that is formed in an inclined shape rising gradually upward in the direction from the first side to the second side.

As such, when the rotary part 283 is rotated by using the lever principle, and the lower surface of the rotary part 233 presses the R button 10 or the D button 20, a contact area between the lower surface of the rotary part 283 and the upper surface of each button increases by the inclined surface, so that operation of each button can be performed without a malfunction.

Figure 19:
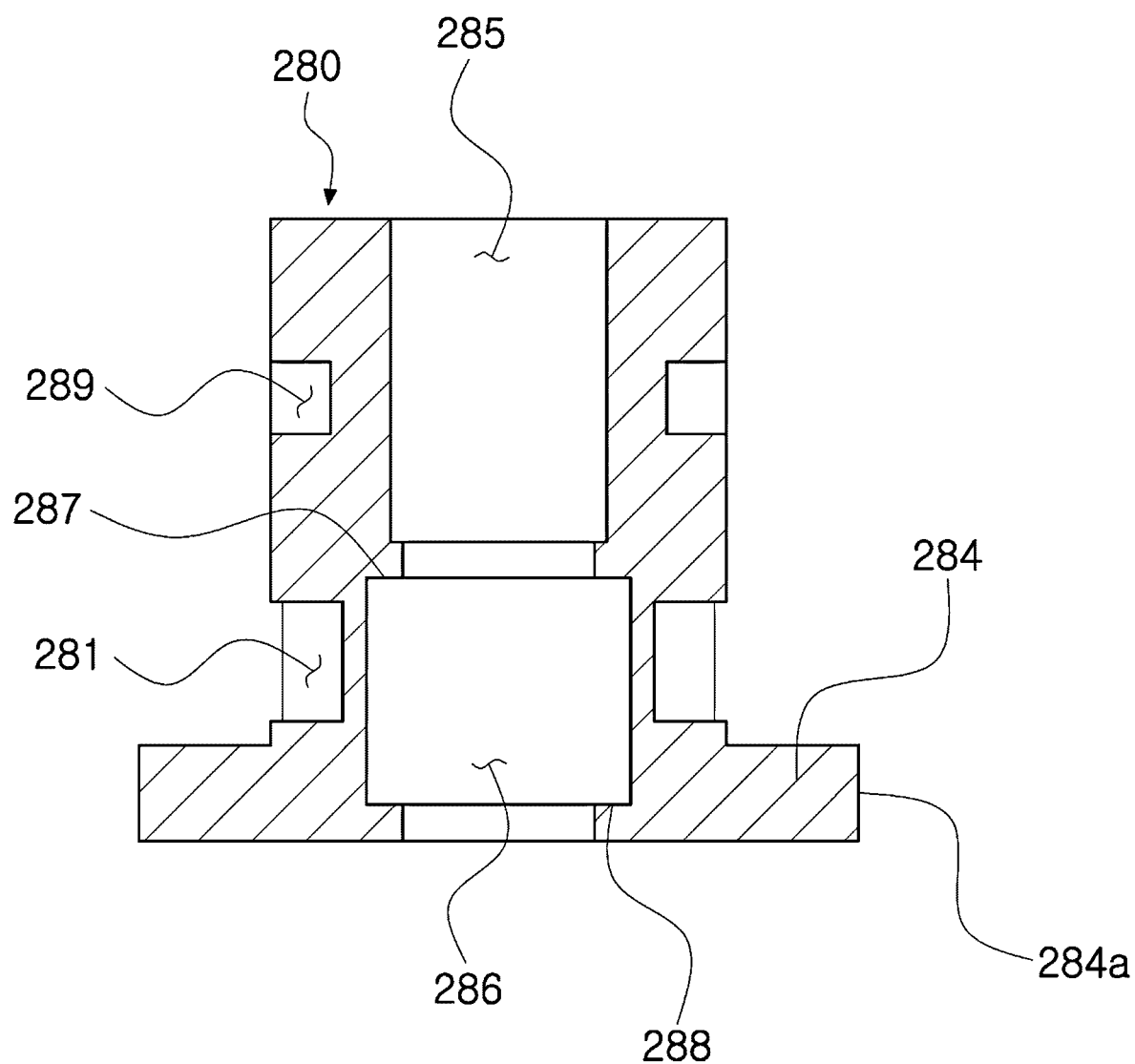
FIG. 19 is a partial side-sectional view showing a rotation part of the vehicle gear knob according to the second embodiment of the present disclosure.

FIG. 19 is a partial side-sectional view showing the rotation part of the vehicle gear knob according to the second embodiment of the present disclosure.

The protrusion 284 is formed in an outward protruding shape on the lower end of the rotation part 280, and is received in the receiving groove 150 of the lower support 100 to be engaged with the toothed wheels 160.

Preferably, the outer circumferential surface of the protrusion 284 may have the second screw thread 284a engaged with the first screw thread 161.

As such, as the first screw thread 161 and the second screw thread 284a are engaged with each other to share the rotation force, the rotation part 280 is supported by the plurality of toothed wheels 160 to be rotated in a stable posture.

The extension opening hole 285 has a shape in which an upper portion based on the center shaft is open, and the extension opening hole 285 is formed to penetrate upper and lower portions thereof.

The elastic support hole 286 has a shape extending downward from the extension opening hole 285 and having an open lower portion based on the center shaft.

At this point, the extension opening hole 285 and the elastic support hole 286 are formed to penetrate the upper surface and the lower surface of the rotation part 280 together, so that the extension opening hole 285 and the elastic support hole 286 provide a space in which a rod 360 of the press operation part 300 to be described below penetrates and slides vertically.

In describing the upper step 287 with reference to FIG. 19, the upper step 287 is formed in a shape protruding between the extension opening hole 235 and the elastic support hole 286 toward the center shaft.

The lower step 288 is formed in a shape protruding on a lower end of the elastic support hole 286 toward the center shaft.

At this point, the elastic support hole 286 formed between the upper step 287 and the lower step 288 provides a space receiving an elastic part 380 of the press operation part 300 to be described below, and the elastic part 380 is caught by a lower portion of the upper step 287 to be prevented from being separated upward and the elastic part 380 is supported by an upper portion of the lower step 288 to elastically support the rod 360 coupled to the elastic part 380.

In other words, the rod 360 of the press operation part 300, which will be described below, penetrates the extension opening hole 285 and the elastic support hole 286 to be slidable upward and downward, and the elastic part 380 coupled to the rod 360 is provided in the elastic support hole 286 to elastically support the rod 360, so that the rod 360 is moved downward to operate the N button 30, and then is moved upward by the elastic force of the elastic part 380 to be returned to the original position thereof.

As shown in FIG. 19, the inner fastening hole 289 is formed in an inward recessed shape on an upper outer circumferential surface, and allows the grip part 400, which will be described below, to be coupled to the upper portion of the rotation part 280 of the upper support 200.

Figure 20:
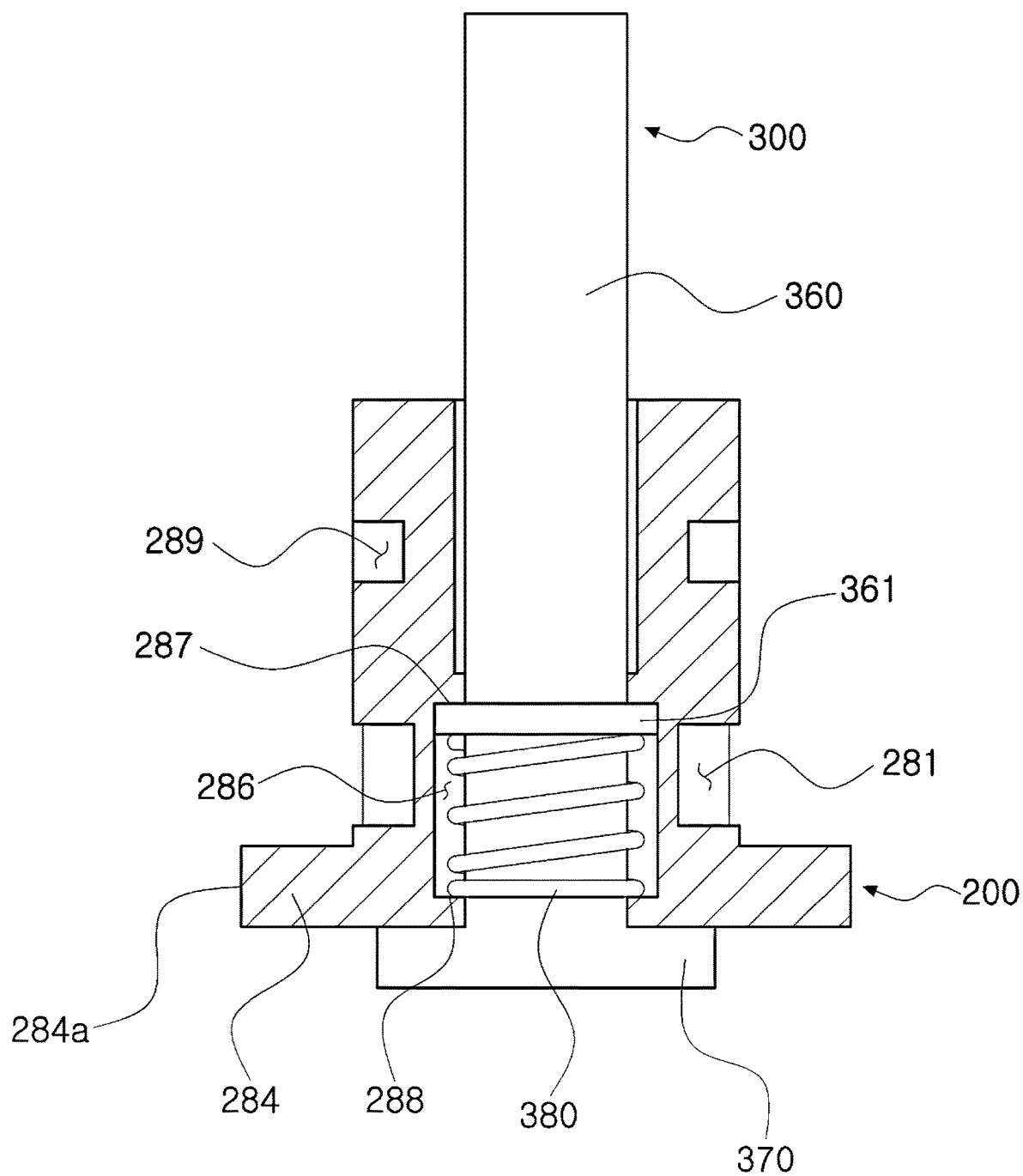
FIG. 20 is a side-sectional view showing an example of coupling of the upper support and the press operation part of the vehicle gear knob according to the second embodiment of the present disclosure.

FIG. 20 is a side-sectional showing an example of coupling of the upper support and the press operation part of the vehicle gear knob according to the second embodiment of the present disclosure.

The press operation part 300 serves to operate the N button 30 by a pressing force while being coupled to the upper support 200, and includes the rod 360, a step locking part 370, and the elastic part 380.

The rod 360 penetrates the extension opening hole 285, the elastic support hole 286, and the receiving groove 150 to be slidable upward and downward, and a lower portion of the rod 360 is seated on the second groove 120 receiving, and an upper end thereof is exposed upward from the grip part 400, which will be described below.

Additionally, the rod 360 provided to penetrate not only the extension opening hole 285, the elastic support hole 286, and the receiving groove 150, but also an opening hole 430 and an insertion hole 440 of the grip part 400, which will be described below, to be slidable upward and downward.

As such, when the driver presses the rod 360 exposed on an upper end of the grip part 400, the rod 360 slides downward to press the N button 30, so that operation of the N button 30 is performed.

At this point, the rod 360 sliding downward operates the N button 30, and then is moved upward by the elastic force of the elastic part 380, which will be described below, to be returned to the original position.

According to a design condition, an outer circumferential surface of the rod 360 may have an anti-separation protrusion 361 formed in an outward protruding shape.

In describing the anti-separation protrusion 361 with reference to FIG. 20, the anti-separation protrusion 361 is provided in the elastic support hole 286 and is caught by the lower portion of the upper step 287 to prevent the rod 360 from being separated from the rotation part 280.

Preferably, the lower portion of the elastic part 380, which will be described below, is supported by the lower step 288, and the upper portion thereof elastically supports a lower portion of the anti-separation protrusion 361, so that the rod 360 is elastically supported upward.

As such, the elastic part 380 elastically supports the lower portion of the anti-separation protrusion 361, so that the rod 360 can be returned to upward by the elastic force.

Referring to FIG. 20, the step locking part 370 is formed in an outward protruding shape on the lower end of the rod 360 and is caught by a lower surface of the lower step 288, thereby preventing the rod 360 from being separated upward.

In other words, the step locking part 370 is caught by the lower step 288 to limit a height of upward movement of the rod 360. Therefore, even when the elastic force of the elastic part 380 elastically supporting the rod 360 upward is changed, the height of the rod 360 exposed upward on the grip part 400 may be maintained constant.

The elastic part 380 is inserted into the elastic support hole 286 to serve to elastically support the rod 360 penetrating the elastic support hole 286.

Preferably, an upper end of the elastic part 380 is securely coupled to the rod 360 and the lower portion thereof is supported by an upper portion of the lower step 288. Accordingly, when an external force of pressing the press operation part 300 downward is applied, the rod 360 is slidably moved downward and contraction of the elastic part 360 occurs, and when the external force is removed, the elastic part 380 expands by the elastic force to move the rod 360 slidably upward to the original position of the rod 360.

At this point, the elastic part 380 may be formed in a spring shape as shown in the accompanying drawings.

Figure 21:
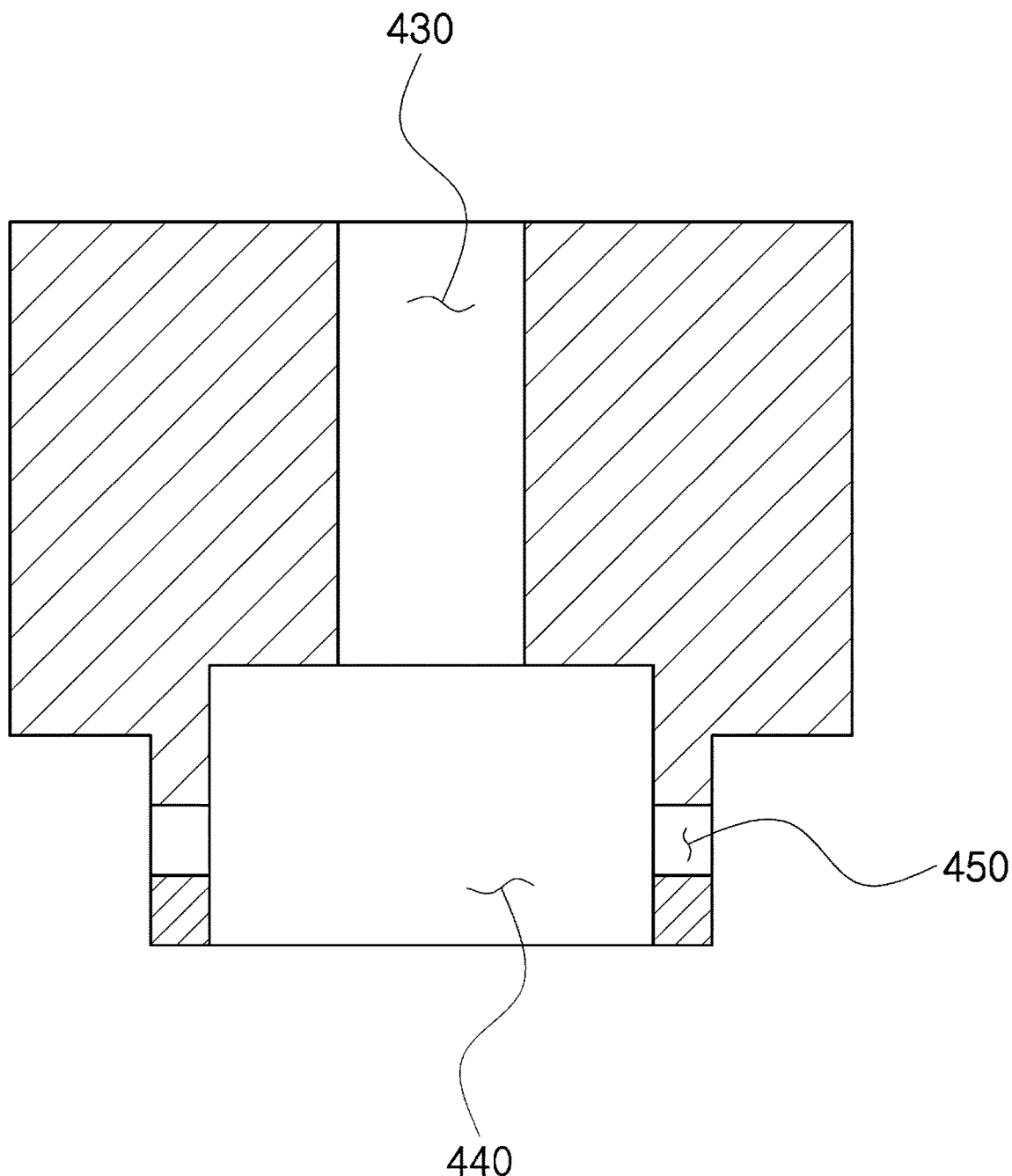
FIG. 21 is a side-sectional view showing the grip part of the vehicle gear knob according to the second embodiment of the present disclosure.
Figure 22:
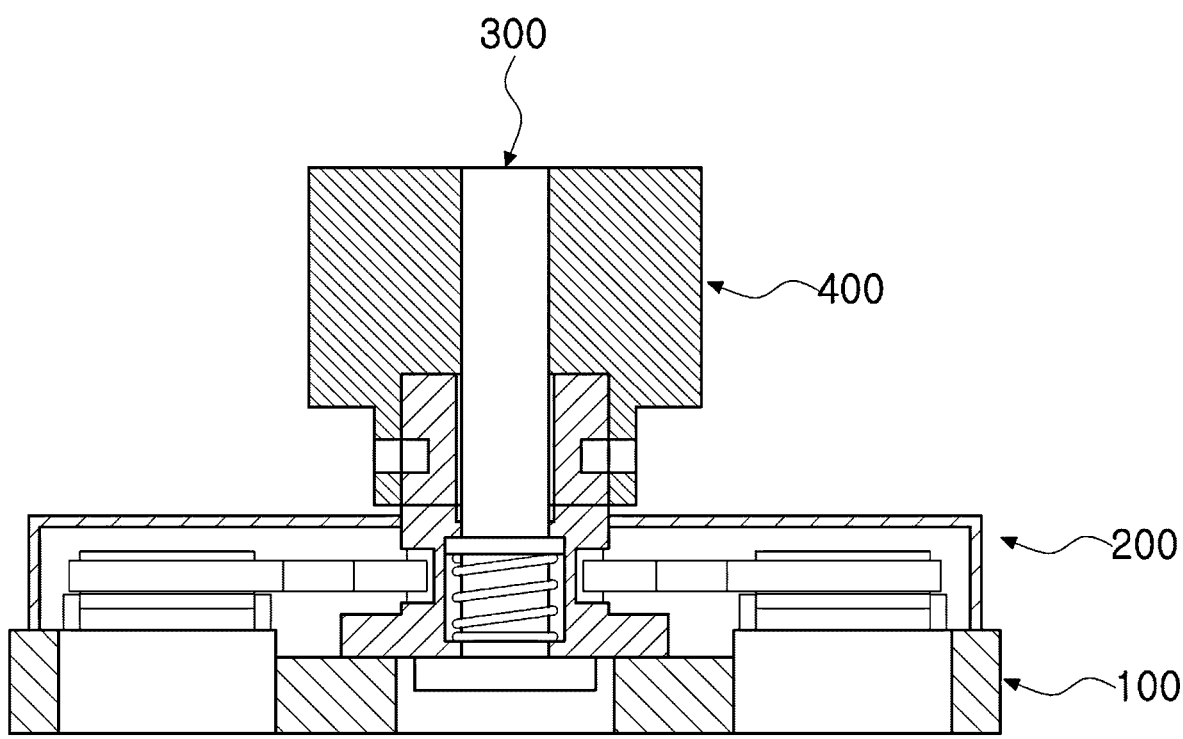
FIG. 22 is a side-sectional view showing the vehicle gear knob according to the second embodiment of the present disclosure.

FIG. 21 is a side-sectional view showing the grip part of the vehicle gear knob according to the second embodiment of the present disclosure. FIG. 22 is a side-sectional view showing the vehicle gear knob according to the second embodiment of the present disclosure.

The grip part 400 is provided on the press operation part 300, and is coupled to the rotation part 280 of the upper support 200 to share the rotation force with the rotation part 280. The grip part 400 includes the opening hole 430, the insertion hole 440, and an outer fastening hole 450.

The grip part 400 is gripped by the driver to allow gear shifting. Specifically, when a force rotating the grip part 400 counterclockwise or clockwise is applied, the grip part 400 selectively operate the R button 10 or the D button 20 by using the lever principle.

The opening hole 430 has a shape in which an upper portion based on the center shaft is open, and the opening hole 430 provides a space through which the rod 360 penetrates to be slidable upward and downward.

The opening hole 430 exposes the rod 360 penetrating the opening hole 430 outward on the upper end thereof, so that the driver can easily press the rod 360.

The insertion hole 440 has a shape extending downward from the opening hole 430, and provides a space into which the rotation part 280 is inserted.

As shown in FIGS. 21 and 22, the insertion hole 440 is formed to have an inner diameter larger than an inner diameter of the opening hole 430 so that a part of the upper portion of the rotation part 280 is inserted into the insertion hole 440.

The outer fastening hole 450 has a shape penetrating a side surface to correspond to the inner fastening hole 289 formed on the upper portion of the rotation part 280 inserted into the insertion hole 440.

The outer fastening hole 450 is fastened with the inner fastening hole 289 by a bolt, etc., so that the rotation part 280 and the grip part 400 are coupled to each other, and therefore, the rotation force is shared between the rotation part 280 and the grip part 400.

In other words, when the driver grips and rotates the grip part 400, the rotation part 280 is rotated together to allow operation of the R button 10 or the D button 20.

At this point, the inner fastening hole 289 and the outer fastening hole 450 may include a plurality of inner fastening holes 239 and a plurality of outer fastening holes 450 that are radially spaced apart from each other on the center shaft.

As such, the fastening force is improved through the plurality of inner fastening holes 289 and the plurality of outer fastening holes 450 so that the rotation part 280 and the grip part 400 may be more firmly coupled to each other.

According to the configuration, when operating the N button 30, the driver presses the upper end of the press operation part 300 exposed on the upper portion of the grip part 400, and the rod 360 of the press operation part 300 is moved downward, and the rod 360 presses the N button 30 to allow operation of the N button 30.

At this point, after operation of the N button 30 is performed, the rod 360 is moved upward by the elastic force of the elastic part 380 to be returned to the original position, until the step locking part 370 is caught by the sower portion of the lower step 288.

In other words, according to the second embodiment of the present disclosure, the vehicle gear knob is configured to allow the R button 10 or the D button 20 to be selectively operated by using the lever principle through the process in which the driver rotates the grip part 400, and to press the press operation part 300 exposed on the grip part 400 to operate the N button 30.

As such, from the existing button method, the shift operating mechanism is replaced with the rotary jog/shuttle method using the lever principle, so that intuitive gear shifting is performed. Accordingly, it is possible to correct gear-mishandling during operation of the existing button type gear, and to reduce the rate of accidents due to malfunction to contribute to safe driving.

Moreover, in case of emergency, in a situation when gear shifting is required, compared to the button type gear shifting structure, it is possible to respond the situation relatively quickly, so the rate of safety accidents can be reduced.

Moreover, the change of the transmission structure allows the driver to intuitionally perform shifting manipulation, thereby preventing the visual field of the driver from being dispersed and providing the convenience.

Hereinbelow, referring to FIGS. 23 to 25, another embodiment of the mechanism by the rotary jog/shuttle method will be described.

First, it is noted that redundant parts with contents described in advance in FIGS. 1 to 22 are not described.

Figure 23:
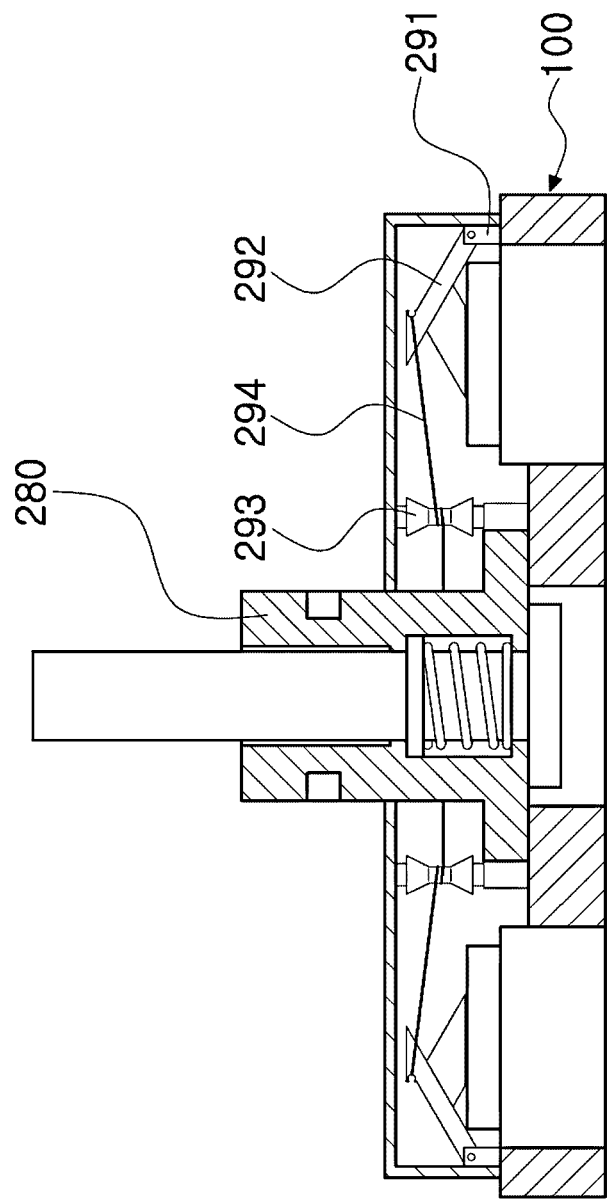
FIG. 23 is a side-sectional view showing the upper support of the vehicle gear knob according to a third embodiment of the present disclosure.
Figure 24:
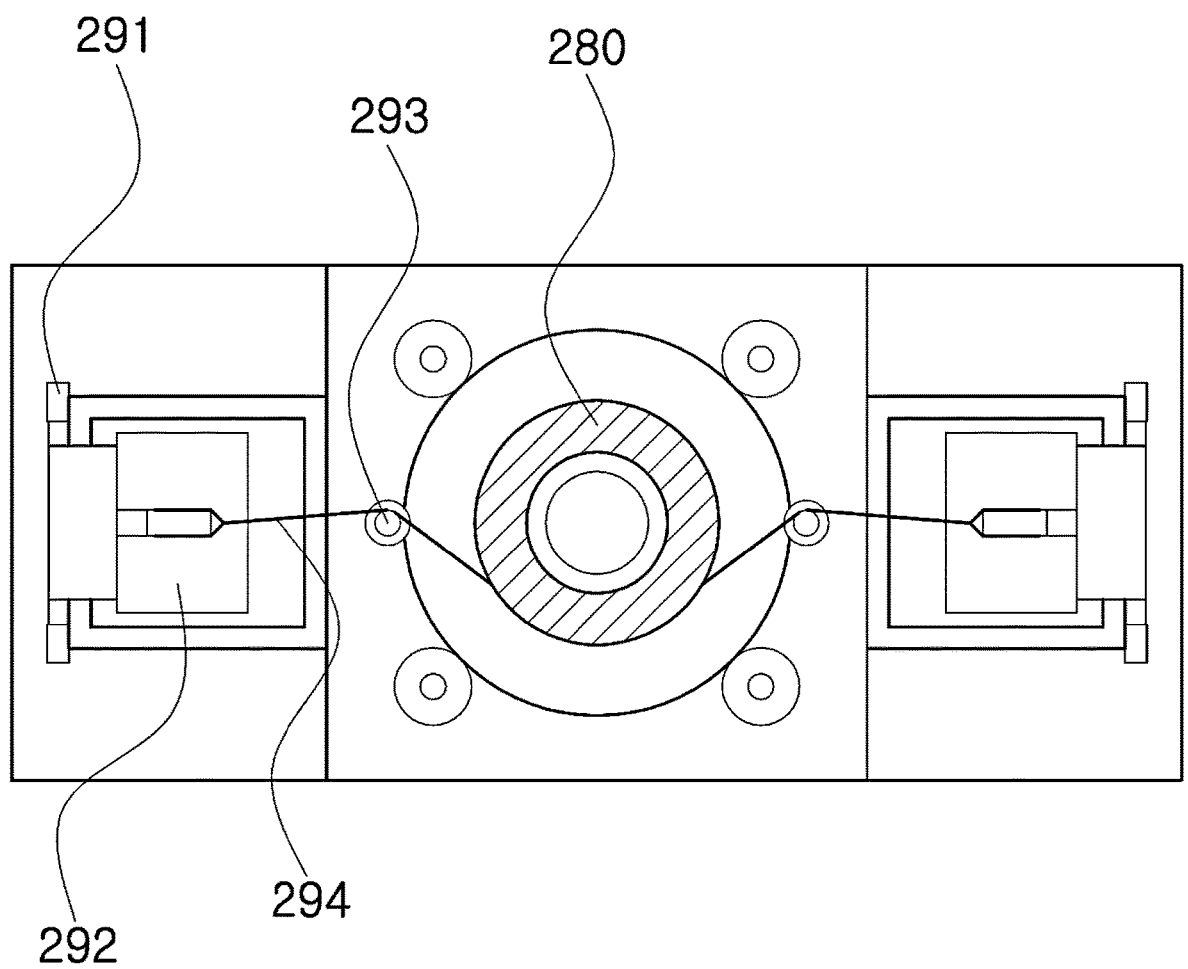
FIG. 24 is a partial plan-sectional view showing the rotation part of the vehicle gear knob according to the third embodiment of the present disclosure.

Moreover, a third embodiment of the present disclosure shown in FIGS. 23 to 25 is configured with the rotary jog/shuttle method having the same mechanism as the second embodiment of the present disclosure shown in FIGS. 11 to 22, and is characterized in that a configuration of operating the R button 10 or the D button 20 by rotation of the rotation part 280 is configured with another embodiment.

In other words, the third embodiment of the present disclosure shown in FIGS. 23 to 25 has the same configuration as the second embodiment of the present disclosure shown in FIGS. 11 to 22, but only the configuration of the rotation part 280 is changed, and the rotation part 280 includes a hinge 291, a rotary pressing part 292, a roller 293, a wire 294, the extension opening hole 285, the elastic support hole 286, the upper step 287, the lower step 288, and the inner fastening hole 289.

FIG. 23 is a side-sectional view showing the upper support of the vehicle gear knob according to the third embodiment of the present disclosure. FIG. 24 is a partial plan-sectional view showing the rotation part of the vehicle gear knob according to the third embodiment of the present disclosure.

The hinge 291 is provided on the lower support 100, and the rotary pressing part 292 is rotatably coupled to the hinge 291.

At this point, the hinge 291 is formed in each of the pair of first grooves 110, and one hinge 291 is provided at a front surface of the first groove 110 formed at the front side, and another hinge 291 is provided on a rear surface of the first groove 110 formed at the rear side.

The rotary pressing part 292 is rotatably coupled to the pair of hinges 291, and as shown in FIG. 23, based on the transverse shaft, the rotary pressing part 292 is configured to be rotated upward and downward from the hinge 291.

In other words, the rotary pressing part 292 is rotated downward, thereby operating the R button 10 or the D button 20 received in each first groove 110.

The roller 293 is provided between the rotation part 280 and the rotary pressing part 292, and is configured to be rotated on the vertical shaft, and the wire 294 to be described below is wound on the roller 293.

At this point, when an imaginary straight line connecting the pair of rotary pressing parts 292 to each other is drawn, the roller 293 may be provided to locate the shaft of the roller 293 on the imaginary straight line.

With the configuration, in the process in which the wire 294 to be described below is pulled or released when the rotation part 280 is rotated, a direction in which the roller 293 is wound or released in the wound state is equal to a direction of the imaginary straight line.

As such, when the rotation part 280 is rotated, even when one portion coupled to the rotation part 280 is eccentric in a rotated direction of the rotation part 280 to be inclined in an oblique shape, a part of the wire 294 to be described below connecting the roller 293 and the rotary pressing part 292 is maintained in a straight-line shape by the roller 293, thereby easily operating the rotary part 283.

In other words, a direction of pulling or releasing the wire 294 and a direction of rotating the rotary part 283 are maintained consistent, so that energy due to rotation of the rotation cart 280 is stably transmitted to rotation of the rotary part 283 and the rotary part 283 can be efficiently operated.

Referring to FIG. 24, the wire 294 is wound on the roller 293, and a first portion of the wire 294 is fixed to an outer circumferential surface of the rotation part 280, and a second portion thereof is fixed to the rotary pressing part 292.

As such, when the rotation part 280 is rotated, the first portion of the wire 294 fixed to the rotation part 280 is, pulled toward the rotation part 280, so that the rotary pressing part 292 is rotated downward to operate the R button 10 or the D button 20 received in each first grooves 110.

Figure 25A:
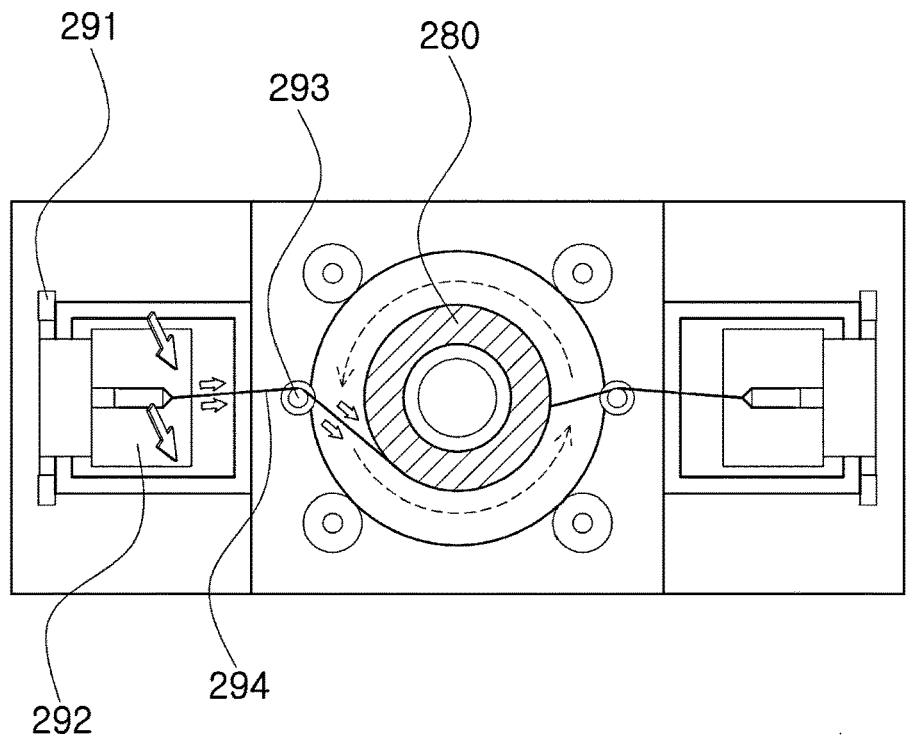
FIGS. 25A and 25B are plan-sectional views showing an example of rotation of the rotation part of the vehicle gear knob according to the third embodiment of the present disclosure.
Figure 25B:
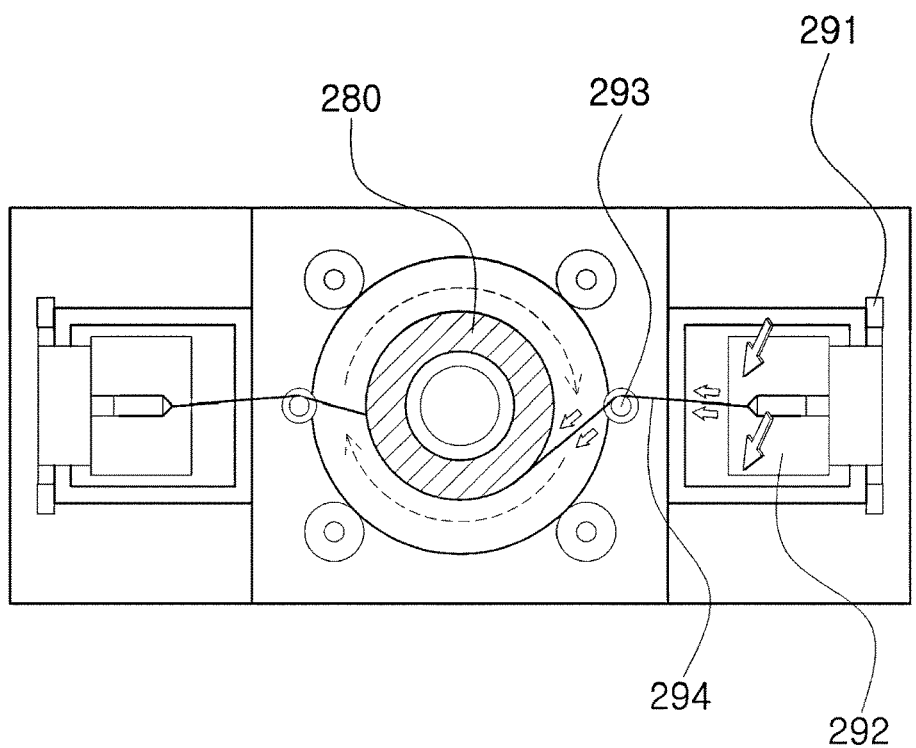

FIGS. 25A and 25B are plan-sectional views showing an example of rotation of the rotation part of the vehicle gear knob according to the third embodiment of the present disclosure.

According to the configuration, according to the third embodiment of the present disclosure, an operation process of the vehicle gear knob will be described with reference to FIG. 25A. First, when the driver grips the grip part 400 and rotates the grip part 400 leftward, the rotation part 280 coupled to the grip part 400 is rotated leftward. As such, as the wire 294 connected to the front surface of the rotation part 280 is pulled, the rotary pressing part 292 provided at the front side of the upper support 200 is rotated downward on the hinge 291 as the shaft, thereby pressing the R button 10 to allow operation of the R button 10.

On the contrary, as shown in FIG. 25B, when the driver grips the grip part 400 and rotates the grip part 400 rightward, the rotation part 280 coupled to the grip part 400 is rotated rightward. As such, as the wire 294 connected to the rear surface of the rotation part 280 is pulled, the rotary pressing part 292 provided at the rear side of the upper support 200 is rotated downward on the hinge 291 as the shaft, thereby pressing the D button 20 to allow operation of the D button 20.

Hereinabove, although the present disclosure has been described with reference to the various embodiments of the present disclosure. However, the present disclosure is not limited to only the embodiments, and those skilled in the art will appreciate that various alternatives, modifications, equivalents of the present disclosure are possible without departing from the spirt and scope of the present disclosure.

The invention claimed is:

1. A vehicle gear knob which replaces a transmission structure having an R button, a D button, and an N button, with a gear rod or a rotary jog/shuttle, the vehicle gear knob comprising:
   a lower support which comprises a pair of first grooves to which the R button and the D button are guided, respectively, and a second groove to which the N button is guided;
   an upper support which is provided on the lower support and blocks the R button, the D button, and the N button from being exposed;
   a press operation part which is coupled to the upper support and operates the N button by a pressing force; and
   a grip part which is provided on the press operation part and is configured to selectively operate either the R button or the D button by pivoting when a driver grips the grip part and applies a force thereto.

2. The vehicle gear knob of claim 1, wherein the lower support comprises a pair of arm brackets which protrude on a left portion and a right portion of an upper end thereof, respectively,
   wherein the upper support comprises:
      operating protrusions which have shapes protruding downward from a front portion and a rear portion of the upper support, respectively;
      a male bracket which protrudes downward from a middle portion of the upper support and is rotatably coupled to the pair of arm brackets;
      a coupling part which has a shape protruding upward on an upper end of the upper support; and
      a through hole which penetrates through a lower surface of the upper support and an upper surface of the coupling part, and
   wherein the operating protrusions is configured, in response to a direction in which the upper support is rotated against the lower support, to selectively operate the R button or the D button.

3. The vehicle gear knob of claim 2, wherein the lower support comprises a pair of seating grooves which have shapes depressed from upper end surfaces between the pair of first grooves and the second groove, respectively,
   wherein the upper support comprises:
      seating protrusions which have shapes protruding downward from lower end surfaces of portions between the operating protrusions and the male bracket, respectively; and
      elastic springs in which the seating protrusions are fitted, and
   wherein, as the upper support is rotated against the lower support, the elastic springs are fitted in the seating grooves and elastically support the upper support in a direction opposite to a rotated direction.

4. The vehicle gear knob of claim 2, wherein the grip part comprises:
   a supporting part coupled to a lower portion of the grip part, and coupled to an upper portion of the coupling part to surround an outer circumferential surface of the upper portion; and
   a knob operation groove penetrating a front surface and a lower portion thereof,
   wherein the press operation part comprises:
      a rotary bar provided in the knob operation groove and having a major axis length in leftward and rightward directions;
      a locking bar provided in the knob operation groove to be spaced apart from a rear surface of the rotary bar, and having a major axis length in the leftward and rightward directions;
      a push-knob rotatably coupled to the rotary bar, supported at an upper portion thereof, by the locking bar, and comprising a push-protrusion at a lower end thereof, the push-protrusion being located above the through hole;
      a gear rod penetrating the through hole to be slidably movable upward and downward, and comprising a locking step formed on an upper end thereof in an outward protruding shape; and
      an elastic member provided to wrap an outer circumferential surface of the gear rod, and caught at an upper end thereof by the locking step 341 to elastically support the gear rod upward, and
   wherein the push-knob is exposed to the front surface of the knob operation groove, and when the exposed portion thereof is pulled upward, as the push-knob is rotate on the rotary bar, the push-protrusion moves the gear rod downward.

5. The vehicle gear knob of claim 1, wherein the lower support comprises a receiving groove which is formed in a shape in which a part of an upper center portion of the lower support is depressed downward,
   wherein the upper support comprises:
      a rotation hole penetrating top and bottom thereof on a center portion thereof; and
      a rotation part penetrating the rotation hole to be rotatable, and having a lower portion fitted into and seated in the receiving groove, and
   wherein the rotation part comprises:
      a guide locking groove which has a shape recessed inward on an outer circumferential surface at each of a front surface and a rear surface;
      a rotary guide provided to be rotatable on a vertical shaft, wherein a portion thereof protrudes in a direction in which each of the R button and the D button is provided, and a remaining part thereof is inserted in the guide locking groove; and
      a rotary part provided to be rotatable leftward and rightward by a jig, when the rotary guide is rotated, the rotary part being rotated together while being brought into contact therewith.

6. The vehicle gear knob of claim 5, wherein the guide locking groove comprises a pair of guide locking grooves that are formed symmetrically on the front surface and the rear surface with a vertical section of the rotation part as a center,
  wherein each of the guide locking grooves comprises:
    a side wall close to a center shaft of the rotation part;
    a locking wall which is connected to an outer circumferential surface of the rotation part in a shape perpendicular to a first portion of the side wall; and
    an inclined surface connected to the outer circumferential surface of the rotation part in a shape inclined from a second portion of the side wall, and
  wherein when the rotation part is rotated, the side wall is brought into contact with the rotary guide to allow the rotary guide to be rotated.

7. The vehicle gear knob of claim 5, wherein the lower support comprises a plurality of toothed wheels which are provided on the receiving groove to be rotatable on vertical shafts, and each having a first screw thread on an outer circumferential surface thereof, and
  wherein the rotation part comprises a protrusion formed in a shape protruding outward on a lower end thereof, and having a second screw thread engaged with the first screw thread.

8. The vehicle gear knob of claim 5, wherein the rotation part comprises:
  an extension opening hole in which an upper portion based on a center shaft is open;
  an elastic support hole which is provided in a shape extending downward from the extension opening hole, and in which a lower portion on the center shaft is open;
  an upper step which is formed in a shape protruding between the extension opening hole and the elastic support hole toward the center shaft; and
  a lower step which is provided in a shape protruding toward the center shaft on a lower end of the elastic support hole, and
  wherein the press operation part comprises:
  a rod penetrating through the extension opening hole, the elastic support hole, and the receiving groove to be slidable;
  a step locking part which is formed in a shape protruding outward at a lower end of the rod and provided in the second groove, and in which an upper surface is caught by a lower portion of the lower step; and
  an elastic part inserted into the elastic support hole and elastically support the rod upward.

9. The vehicle gear knob of claim 8, wherein the rotation part comprises an inner fastening hole formed in an inwardly recessed shape on an upper outer circumferential surface,
  wherein the grip part comprises:
    an opening hole formed in a shape in which an upper portion is open on the basis of a center shaft, and through which the rod penetrates to be slidable upward and downward;
    an insertion hole which is formed in a shape that extends downward below the opening hole, and into which the rotation part is inserted; and
    an outer fastening hole which is formed by penetrating a side surface to correspond to the inner fastening hole, and
  wherein the inner fastening hole and the outer fastening hole are fastened to each other in a bolt-coupling manner, so that the rotation part and the grip part share a rotation force with each other.

10. The vehicle gear knob of claim 1, wherein the lower support comprises a receiving groove which is formed in a shape in which a part of an upper center portion of the lower support is depressed downward,
  wherein the upper support comprises:
    a rotation hole penetrating top and bottom thereof on a center portion thereof; and
    a rotation part penetrating the rotation hole to be rotatable, and having a lower portion fitted into and seated in the receiving groove, and
  wherein the rotation part comprises:
    a hinge provided on the lower support;
    a rotary pressing part rotatably provided at the hinge;
    a roller provided to be rotatable on a vertical shaft; and
    a wire wound around the roller, of which a first portion is fixed on an outer circumferential surface of the rotation part and a second portion is fixed to the rotary pressing part.

11. The vehicle gear knob of claim 10, wherein the lower support comprises a plurality of toothed wheels which are provided on the receiving groove to be rotatable on vertical shafts, and each having a first screw thread on an outer circumferential surface thereof, and
  wherein the rotation part comprises a protrusion formed in a shape protruding outward on a lower end thereof, and having a second screw thread engaged with the first screw thread.

12. The vehicle gear knob of claim 10, wherein the rotation part comprises:
  an extension opening hole in which an upper portion based on a center shaft is open;
  an elastic support hole which is provided in a shape extending downward from the extension opening hole, and in which a lower portion on the center shaft is open;
  an upper step which is formed in a shape protruding between the extension opening hole and the elastic support hole toward the center shaft; and
  a lower step which is provided in a shape protruding toward the center shaft on a lower end of the elastic support hole, and
  wherein the press operation part comprises:
  a rod penetrating through the extension opening hole, the elastic support hole, and the receiving groove to be slidable;
  a step locking part which is formed in a shape protruding outward at a lower end of the rod and provided in the second groove, and in which an upper surface is caught by a lower portion of the lower step; and
  an elastic part inserted into the elastic support hole and elastically support the rod upward.

13. The vehicle gear knob of claim 12, wherein the rotation part comprises an inner fastening hole formed in an inwardly recessed shape on an upper outer circumferential surface,
  wherein the grip part comprises:
    an opening hole formed in a shape in which an upper portion is open on the basis of a center shaft, and through which the rod penetrates to be slidable upward and downward;
    an insertion hole which is formed in a shape that extends downward below the opening hole, and into which the rotation part is inserted; and
    an outer fastening hole which is formed by penetrating a side surface to correspond to the inner fastening hole, and
  wherein the inner fastening hole and the outer fastening hole are fastened to each other in a bolt-coupling manner, so that the rotation part and the grip part share a rotation force with each other.

* * * * *